(12) United States Patent
Zhao et al.

(10) Patent No.: US 11,991,732 B2
(45) Date of Patent: *May 21, 2024

(54) ELECTRONIC DEVICE AND METHOD FOR WIRELESS COMMUNICATION, AND COMPUTER-READABLE STORAGE MEDIUM

(71) Applicant: Sony Group Corporation, Tokyo (JP)

(72) Inventors: Youping Zhao, Beijing (CN); Lu Shi, Beijing (CN); Yu Zhao, Beijing (CN); Chen Sun, Beijing (CN); Xin Guo, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/206,080

(22) Filed: Jun. 6, 2023

(65) Prior Publication Data

US 2023/0319863 A1 Oct. 5, 2023

Related U.S. Application Data

(63) Continuation of application No. 17/727,808, filed on Apr. 25, 2022, now Pat. No. 11,711,840, which is a (Continued)

(30) Foreign Application Priority Data

Apr. 27, 2018 (CN) .......................... 201810392098.8

(51) Int. Cl.
*H04W 72/541* (2023.01)
*H04W 16/10* (2009.01)
(52) U.S. Cl.
CPC ......... *H04W 72/541* (2023.01); *H04W 16/10* (2013.01)

(58) Field of Classification Search
None
See application file for complete search history.

(56) References Cited

U.S. PATENT DOCUMENTS 5,774,730 A * 6/1998 Aizikowitz ............. G06F 8/433
717/109
2004/0023660 A1 * 2/2004 Ben-Eli ............... H04L 47/2416
455/450

(Continued)

FOREIGN PATENT DOCUMENTS

CN 1347206 A * 5/2002 ............ H04W 72/10
CN 1347206 A 5/2002
(Continued)

OTHER PUBLICATIONS

International Search Report and Written Opinion dated Jul. 24, 2019 for PCT/CN2019/083655 filed on Apr. 22, 2019, 8 pages including English Translation of the International Search Report.

*Primary Examiner* — Jamaal Henson
(74) *Attorney, Agent, or Firm* — XSENSUS LLP

(57) ABSTRACT

Provided are an electronic device and method for wireless communication, and a computer-readable storage medium. The electronic device comprises: a processing circuit, configured to: construct an interference overlapping diagram based on an interference/coexistence relationship between resource application systems within a management range, wherein a connection point of the interference overlapping diagram represents one or more resource application systems, and an edge of the interference overlapping diagram represents the fact that interference exists between the resource application systems represented by two connection points linked with the edge; remove one or more edges in the interference overlapping diagram so as to enable the interference overlapping diagram to meet a pre-determined condition after the removal; and carry out channel/resource (Continued)

allocation based on the adjusted interference overlapping diagram.

7 Claims, 14 Drawing Sheets

Related U.S. Application Data continuation of application No. 16/962,523, filed as application No. PCT/CN2019/083655 on Apr. 22, 2019, now Pat. No. 11,350,423.

(56) References Cited

U.S. PATENT DOCUMENTS

| | | | |
|---|---|---|---|
| 2009/0203372 A1 | | 8/2009 | Horn et al. |
| 2013/0090147 A1* | | 4/2013 | Yamazaki ......... H04W 52/0206 |
| | | | 455/522 |
| 2013/0194984 A1* | | 8/2013 | Cheng ................. H04L 5/0073 |
| | | | 370/294 |
| 2015/0079974 A1 | | 3/2015 | Farhadi et al. |
| 2016/0380730 A1* | | 12/2016 | Ghosh ................ H04L 25/0224 |
| | | | 370/329 |
| 2018/0242165 A1 | | 8/2018 | Macmullan et al. |

FOREIGN PATENT DOCUMENTS

| | | | | |
|---|---|---|---|---|
| CN | 102664855 A | | 9/2012 | |
| CN | 103079278 A | * | 5/2013 | |
| CN | 103079278 A | | 5/2013 | |
| CN | 102970683 B | * | 7/2015 | |
| CN | 102970683 B | | 7/2015 | |
| CN | 106658521 A | * | 5/2017 | ............ H04W 16/10 |
| CN | 106658521 A | | 5/2017 | |
| CN | 106658526 A | | 5/2017 | |
| EP | 1729532 A1 | * | 12/2006 | ............ H04W 16/00 |
| EP | 1729532 A1 | | 12/2006 | |
| JP | 2013-81089 A | | 5/2013 | |
| JP | 2013081089 A | * | 5/2013 | |
| WO | 2009/026838 A1 | | 3/2009 | |
| WO | WO-2009026838 A1 | * | 3/2009 | ......... H04L 12/1881 |

* cited by examiner

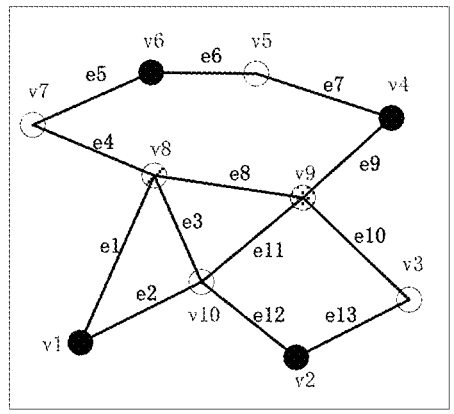
Figure 3
| Edge | e1 | e2 | e3 | e4 | e5 | e6 | e7 |
|---|---|---|---|---|---|---|---|
| Threshold (dB) | 20 | 21 | 23 | 20 | 25 | 20 | 21 |
| Actually measured value (dB) | 17 | 16 | 20 | 18 | 22 | 17 | 15 |
| SINR margin (dB) | 3 | 5 | 3 | 2 | 3 | 3 | 6 |
| Edge | e8 | e9 | e10 | e11 | e12 | e13 | |
| Threshold (dB) | 26 | 26 | 25 | 23 | 22 | 20 | |
| Actually measured value (dB) | 25 | 23 | 19 | 16 | 16 | 15 | |
| SINR margin (dB) | 1 | 3 | 6 | 7 | 6 | 5 | |
Figure 4
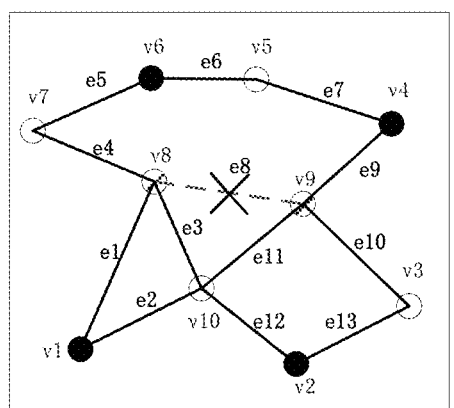
Figure 5

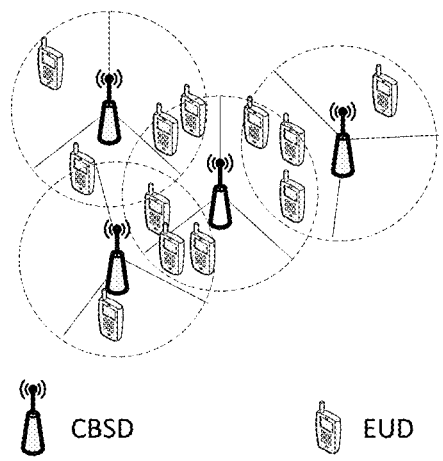
Figure 6
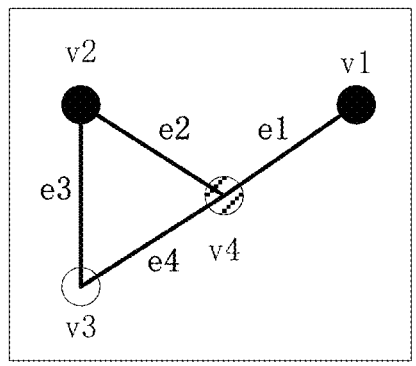
Figure 7
| Edge | e1 | e2 | e3 | e4 |
|---|---|---|---|---|
| Number of EUD ($N_e$) | 3 | 2 | 1 | 3 |
| Area of sector ($S_e$) | S | S | 2S | 2S |
| Density of EUD ($\rho$) | 3/S | 2/S | 1/2S | 3/2S |
Figure 8

| Color | Blue | Red | Green |
|---|---|---|---|
| Vertex | 1  3  4 | 2  5  7 | 6  8 |

| CBSD number | 1 | 2 | 3 | 4 | 5 | 6 | 7 | 8 |
|---|---|---|---|---|---|---|---|---|
| Channel requirement | 2 | 3 | 4 | 1 | 3 | 2 | 4 | 2 |
| Allocated primary channel | 2 | 2 | 2 | 2 | 2 | 2 | 2 | 2 |
| Extension channel | 0 | 0 | 2 | 0 | 0 | 0 | 2 | 0 |
| Primary channel re-equalization | 0 | 0 | 0 | 0 | 1 | 0 | 0 | 0 |

ELECTRONIC DEVICE AND METHOD FOR WIRELESS COMMUNICATION, AND COMPUTER-READABLE STORAGE MEDIUM

CROSS-REFERENCE TO RELATED APPLICATIONS

The present disclosure is a continuation of U.S. application Ser. No. 17/727,808, filed Apr. 25, 2022, which is a continuation of U.S. application Ser. No. 16/962,523, filed Jul. 16, 2020 (now U.S. Pat. No. 11,350,423), which is based on PCT filing PCT/CN2019/083655, filed Apr. 22, 2019, which claims priority to Chinese Patent Application No. 201810392098.8, filed Apr. 27, 2018 with China National Intellectual Property Administration, each of which is incorporated herein by reference in its entirety.

FIELD

The present disclosure relates to the technical field of wireless communications, and in particular to spectrum management technology. More particularly, the present disclosure relates to an electronic apparatus and a method for spectrum resources allocation in wireless communications and a computer-readable storage medium.

BACKGROUND

With development of wireless communication technology, a large amount of spectrum resources are required to support the new service arising continuously, and to meet requirements of high-speed communications, such that spectrum resources become more and more short. Currently, limited spectrum resources have been allocated to fixed operators and services, new available spectrum is very rare or expensive. In this case, a concept of dynamic spectrum utilization is proposed, that is, spectrum resources which have been allocated to certain services but are not utilized sufficiently are utilized dynamically.

For example, the Federal Communications Commission (FCC) has opened the 150 MHz spectrum (3350~3700 MHz) in the 3.5 GHz frequency band in the name of "Citizens Broadband Radio Service (CBRS)" for commercial use in US. The CBRS is implemented by forming a three-level shared framework by a Spectrum Access System (SAS), which includes: existing users with the highest priority level (such as the government or military communication equipment), that is, Incumbent Access users; the second level users with Priority Access License (PAL); and the third level users with General Authorized Access (GAA). The main functional entities in the SAS include Citizens Broadband Radio Service Devices (CBSD) and End User Device (EUD).

In the case of dynamic spectrum utilization, it is required to manage the utilization of spectrum resources, to ensure the fairness and effectiveness of spectrum resources utilization.

SUMMARY

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

According to an aspect of the present disclosure, an electronic apparatus for wireless communications is provided. The electronic apparatus includes processing circuitry. The processing circuitry is configured to: construct, based on interference/co-existence relationship between resource utilization systems within a management range, an interference overlapping map, a connection point of which represents one or more resource utilization systems, and an edge of which represents that there are interferences between the resource utilization systems represented by two connections points of the edge; remove one or more edges of the interference overlapping map, so that the interference overlapping map satisfies a predetermined condition after the removing; and perform channel/resources allocation based on the adjusted interference overlapping map.

According to another aspect of the present disclosure, a method for wireless communications is provided. The method includes: constructing, based on interference/co-existence relationship between resource utilization systems within a management range, an interference overlapping map, a connection point of which represents one or more resource utilization systems, and an edge of which represents that there are interferences between the resource utilization systems represented by two connections points of the edge; removing one or more edges of the interference overlapping map, so that the interference overlapping map satisfies a predetermined condition after the removing; and performing channel/resources allocation based on the adjusted interference overlapping map.

According to another aspect of the present disclosure, an electronic apparatus for wireless communications is provided. The electronic apparatus includes processing circuitry. The processing circuitry is configured to: calculate, based on an available spectrum resources amount allocated by a central management apparatus for a resource utilization system and a spectrum requirement of the resource utilization system, a spectrum satisfaction degree of the resource utilization system; and provide the spectrum satisfaction degree to the central management apparatus.

According to another aspect of the present disclosure, a method for wireless communications is provided. The method includes: calculating, based on an available spectrum resources amount allocated by a central management apparatus for a resource utilization system and a spectrum requirement of the resource utilization system, a spectrum satisfaction degree of the resource utilization system; and providing the spectrum satisfaction degree to the central management apparatus.

According to other aspects of the present disclosure, there are further provided computer program codes and computer program products for implementing the methods for wireless communications above, and a computer readable storage medium having recorded thereon the computer program codes for implementing the methods for wireless communications described above.

With the electronic apparatus and method for wireless communications according to the present disclosure, the interference overlapping map can be adjusted to satisfy the predetermined condition, and spectrum resources allocation is performed based on the adjusted interference overlapping map, which is beneficial to improve spectrum utilization efficiency and satisfy the spectrum requirement of each resource utilization system.

These and other advantages of the present disclosure will be more apparent by illustrating in detail a preferred embodiment of the present disclosure in conjunction with accompanying drawings below.

BRIEF DESCRIPTION OF THE DRAWINGS

To further set forth the above and other advantages and features of the present disclosure, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present disclosure and should not be construed as a limitation to the scope of the disclosure. In the accompanying drawings:

FIG. 3 shows an example of an interference overlapping map constructed based on FIG. 2;

FIG. 4 shows examples of a SINR threshold, an actual measured value of SINR, and a SINR margin corresponding to each edge in FIG. 3;

FIG. 5 shows an example of an interference overlapping map after adjustment;

FIG. 6 is a schematic diagram showing spatial distribution of coverage regions of resource utilization systems;

FIG. 7 shows an example of an interference overlapping map constructed based on FIG. 6;

FIG. 8 shows a density of terminal devices corresponding to each edge of the interference overlapping map shown in FIG. 7;

DETAILED DESCRIPTION OF EMBODIMENTS

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

First Embodiment

As described above, specific spectrum may be dynamically utilized among different wireless communication systems (wireless communication systems of the same type or wireless communication systems of different types), and it is required to manage the dynamic utilization of the spectrum. For example, a central management apparatus or a spectrum management apparatus may be provided to manage the utilization of the spectrum of wireless communication systems within its management region. Herein, the wireless communication systems are also referred to as resource utilization systems. For example, the resource utilization system may include the above-described CBSD and EUD, or the resource utilization system may include a base station and user equipment.

Within the management range of the central management apparatus, there are generally multiple resource utilization systems. The central management apparatus allocates available spectrum resources among the resource utilization systems reasonably to ensure resource utilization efficiency and fairness. The allocated spectrum resources are, for example, spectrum resources on unlicensed frequency bands. The following description may be made with reference to the CBRS sharing framework, but it should be understood that the technology of the present disclosure is not limited to CBRS, and may be applied to any case where it is required to allocate spectrum resources among multiple resource utilization systems within the same geographic range.

Figure 1:
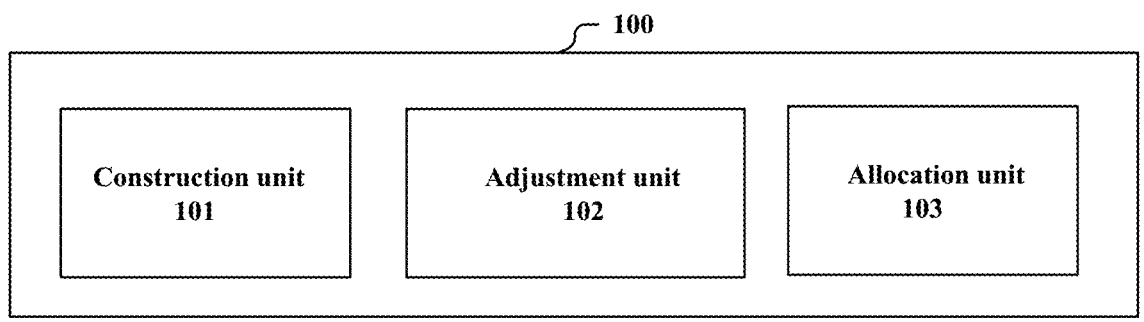
FIG. 1 is a block diagram showing functional modules of an electronic apparatus for wireless communications according to an embodiment of the present disclosure.

FIG. 1 is a block diagram showing functional modules of an electronic apparatus 100 for wireless communications according to an embodiment of the present disclosure. As shown in FIG. 1, the electronic apparatus 100 includes a construction unit 101, an adjustment unit 102 and an allocation unit 103. The construction unit 101 is configured construct an interference overlapping map based on interference/co-existence relationship between resource utilization systems within a management range. A connection point of the interference overlapping map represents one or more resource utilization systems, and an edge of the interference overlapping map represents that there are interferences between the resource utilization systems represented by two connections points of the edge. The adjustment unit 102 is configured to remove one or more edges of the interference overlapping map, so that the interference overlapping map satisfies a predetermined condition after removing the one or more edges. The allocation unit 103 is configured to perform channel/resources allocation based on the adjusted interference overlapping map.

The construction unit 101, the adjustment unit 102, and the allocation unit 103 may be implemented by one or more processing circuits, and the processing circuit(s) may be implemented as a chip, for example. Moreover, it should be understood that various functional units in the apparatus shown in FIG. 1 are only logical modules divided according to their specific functions, and are not intended to limit specific implementation manners. This also applies to the examples of other electronic apparatuses to be described later.

The electronic apparatus 100 may be arranged, for example, on the side of the central management apparatus or communicatively connected to the central management apparatus. In addition, the electronic apparatus 100 may also be arranged on the side of the core network. The central management apparatus described herein may be implemented as various functional entities, such as SAS or Coexistence Manager (CxM) in the above described CBRS architecture. In the CBRS architecture, it may also be configured that the SAS implements a part of the functions of the electronic apparatus 100, and the CxM implements another part of the functions of the electronic apparatus 100. It should be understood that these are not limiting.

It should also be noted that the electronic apparatus 100 may be implemented at the chip level, or may also be implemented at the device level. For example, the electronic apparatus 100 may operate as the central management apparatus itself, and may also include external devices such as a memory, a transceiver (which are not shown in the figure). The memory may be used to store programs required to be executed by the central management apparatus to realize various functions and related data information. The transceiver may include one or more communication interfaces to support communication with different devices (for example, a base station, other central management apparatus, etc.), and the implementation form of the transceiver is not specifically limited herein.

The construction unit 101 is used to construct an interference overlapping map, which is used to represent the interference/co-existence relationship between resource utilization systems within the management range of the central management apparatus in the form of a map. In the interference overlapping map, there are multiple connection points, each connection point represents a resource utilization system, or each connection point represents multiple resource utilization systems that may use the same spectrum resources. In other words, in a case that multiple resource utilization systems can coexist, the multiple resource utilization systems are represented as a single connection point on the interference overlapping map.

Specifically, the construction unit 101 constructs an initial interference overlapping map, where each connection point represents a resource utilization system, and in a case that there are mutual interferences between resource utilization systems represented by two connection points, an edge is linked between the two connection points.

In an example, the construction unit 101 may determine whether there are mutual interferences between a first resource utilization system and a second resource utilization system based on one of the following: whether there is a terminal device in a coverage overlapping region between the first resource utilization system and the second resource utilization system; and whether there is a terminal device of which communication quality is lower than a predetermined level in a coverage overlapping region between the first resource utilization system and the second resource utilization system.

It should be understood that the term "first" and "second" described herein are used for distinguishing purposes only, and do not represent any order or other specific meanings. The terminal device is, for example, various user equipment in the resource utilization system. The user equipment may be implemented as a mobile terminal (such as a smart phone, a tablet personal computer (PC), a notebook PC, a portable game terminal, a portable/dongle-type mobile router, and a digital camera device) or an in-vehicle terminal (such as a car navigation device). The user equipment may also be implemented as a terminal that performs machine-to-machine (M2M) communication (which is also referred to as a machine type communication (MTC) terminal). In addition, the user equipment may be a wireless communication module (such as an integrated circuit module including a single wafer) installed on each of the above terminals.

Whether there is a terminal device in the coverage overlapping region may be determined and reported by a network management apparatus, such as a CBSD, in the resource utilization system, and the communication quality of the terminal device may also be obtained by the CBSD instructing the terminal device to measure. By judging whether there are interferences between two resource utilization systems in the above manner, the interference status between resource utilization systems may be obtained more accurately.

In an example, the construction unit 101 is configured to determine that there are interferences between the first resource utilization system and the second resource utilization system in the case that there is at least one terminal device of which communication quality is lower than a predetermined level in the coverage overlapping region, and link an edge between a first connection point corresponding to the first resource utilization system and a second connection point corresponding to the second resource utilization system in the interference overlapping map.

For example, the communication quality of the terminal device may be expressed by the signal to interference and noise ratio (SINR) of the terminal device. The SINR may be measured by the terminal device (EUD). In a case that the EUD served by the first resource utilization system is located in the coverage overlapping region of the first resource utilization system and the second resource utilization system and the measured SINR satisfies the following equation (1), the construction unit 101 determines that there are interferences between the first resource utilization system and the second resource utilization system.

$$\frac{s_A}{I_B + \sigma^2} < SINR_m^{th} \quad (1)$$

where A and B represent the first resource utilization system and the second resource utilization system, respectively, $SINR_m^{th}$ represents a SINR threshold of an m-th EUD in the overlapping region, and $S_A$ represents a power value of a signal received by the m-th EUD from the first resource utilization system, $I_B$ represents a power value of interferences received by the m-th EUD from the second resource utilization system, and $\sigma^2$ represents a power value of a noise signal.

It should be understood that the SINR is only an example, and the communication quality of the terminal device may also be expressed by another indicator. After the judgement on the mutual interferences between any two resource utilization systems is performed, the construction unit 102 obtains an initial interference overlapping map.

Next, the construction unit 101 merges the connection points representing the resource utilization systems that can utilize the same spectrum resources in the initial interference overlapping map to obtain an updated interference overlapping map.

For example, for the CBRS architecture, the construction unit 101 performs the above-described merging when constructing the interference overlapping map, so that all members (that is, CBSDs) in the same common channel group (CCG) are represented by one connection point, and the number of resource utilization systems represented by each connection point is used as a parameter of the interference overlapping map. The construction unit 101 may traverse the initial interference overlapping map, to find the connection points representing the CBSDs with the same CCG identifier (ID) and performs merging. For example, the overlapping map subjected to merging may be expressed as G=(V, E, N), where V represents a set of connection points, E represents a set of edges, and N represents a set of the number of CBSDs in each connection point.

After the construction unit 101 constructs the interference overlapping map, the adjustment unit 102 may adjust the interference overlapping map to make it satisfy a predetermined condition, where the adjustment is, for example, removing one or more edges of the constructed interference overlapping map. Since the edge of the interference overlapping map represents an interference relationship between resource utilization systems, removing an edge refers to ignoring mutual interferences between resource utilization systems corresponding to the edge. In the case of ignoring the mutual interferences, these resource utilization systems may be allocated with the same spectrum resources or the same channel, thereby improving spectrum utilization efficiency. In an example, the adjustment unit 102 is configured to remove one or more edges of the interference overlapping map, so that in a case of performing the channel/resources allocation based on the interference overlapping map obtained after removing, variation of network overall interference conditions is minimized or a spectrum resource utilization efficiency is optimized.

As an example, the adjustment unit 102 is configured to: for each edge in the interference overlapping map, calculate a parameter related to mutual interferences between the resource utilization systems; select, based on the parameter, one edge as an edge to be removed and perform the removing, so that compared with removing other edges, the variation of the network overall interference conditions is minimized when performing the channel/resources allocation based on the interference overlapping map after the removing; judge whether the interference overlapping map after the removing satisfies the predetermined condition. In the case where the predetermined condition is not satisfied, the calculation of the above parameter and the removing of edge are continued.

For example, the predetermined condition may be that the number of required channels determined based on the interference overlapping map is not greater than the number of available channels, to satisfy the spectrum requirements of the resource utilization system to the greatest extent. Alternatively, the predetermined condition may be that the number of required channels determined based on the interference overlapping map is a predetermined value.

In addition, the adjustment unit 102 may further be configured to select an edge to be removed as follows: higher spectrum utilization efficiency can be realized when performing channel/resources allocation based on the interference overlapping map obtained after removing the edge than removing other edges.

Several examples of the parameter and the corresponding operations of the adjustment unit 102 will be described below with reference to FIGS. 2 to 10.

In an example, the parameter is a gap between a communication quality of a terminal device in the coverage overlapping region of the resource utilization systems represented by the two connection points of each edge and a threshold of the communication quality of the terminal device, and the adjustment unit 102 is configured to select an edge corresponding to a terminal device with the minimum gap as the edge to be removed. The minimum gap means that the communication quality of the terminal device is closest to the threshold of the communication quality, and the effect generated by removing this edge would be minimum.

Figure 2:
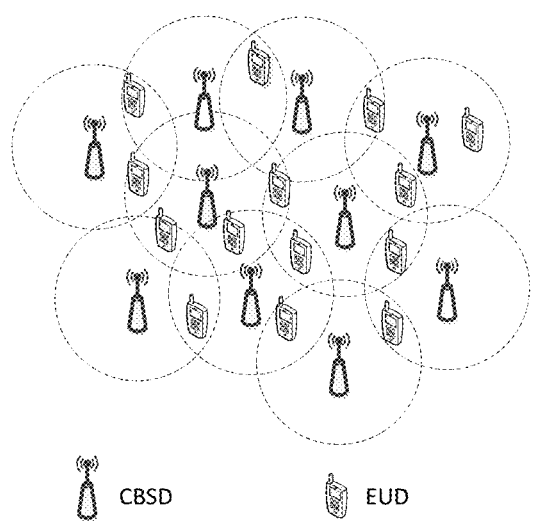
FIG. 2 is a schematic diagram showing spatial distribution of coverage regions of resource utilization systems.

For ease of understanding, FIG. 2 is a schematic diagram showing spatial distribution of coverage regions of resource utilization systems. Taking the CBRS architecture as an example, the resource utilization system includes CBSD and EUD. The CBSD provides services for the EUD within the coverage range. FIG. 3 shows an example of the interference overlapping map constructed based on FIG. 2. Connection points v1 to v10 represent the CBSDs in FIG. 2. In a case that there is a EUD of which communication quality is lower than the threshold in the overlapping region of the coverage ranges of the two CBSDs, an edge is linked between the connection points corresponding to the two CBSDs. The edges in FIG. 3 include e1 to e13.

In the case that the communication quality is expressed by SINR, the adjustment unit 102 calculates a SINR margin as follows, for example:

$$SINR_r = SINR_m^{th} - \frac{S_A}{I_B + \sigma^2} \quad (2)$$

The definition of each parameter in equation (2) is the same as that of equation (1), and will not be repeated here. Where $$\frac{S_A}{I_B + \sigma^2}$$

represents the actually measured SINR by the EUD. The adjustment unit 102 calculates, for each edge, that is, each of e1 to e13, $SINR_r$ of the EUD in its corresponding overlapping region. FIG. 4 shows examples of a SINR threshold, an actually measured value of the SINR and a SINR margin corresponding to each edge in FIG. 3.

The adjustment unit 102 selects an edge with the minimum $SINR_r$ as an edge to be removed. As shown in FIG. 4, the adjustment unit 102 selects the edge e8 with the minimum SINR margin (1 dB) as' the edge to be removed. FIG. 5 shows an example of the interference overlapping map after adjustment.

For example, the allocation unit 103 may color the interference overlapping map and perform channel/resources allocation based on a result of coloring. The allocation unit 103 may, for example, color the interference overlapping map by using a sequential coloring greedy algorithm. Specifically, the connection point and color may be initialized first, that is, the connection point (j) and the color (i) are numbered. The connection points are colored in order according to the number of the connection points. For each connection point, it is started from the color i=1. If the color of an adjacent connection point of this connection point is i, the number of colors is increased until there is not the same color between adjacent connection points. It is judged whether all the connection points are colored. If yes, the coloring is completed. The obtained number of colors is the minimum number of colors. If not, j=j+1 and it is continued to color the connection points. The allocation unit 103 may allocate the same channel/resources to the connection points of the same color. Therefore, the number of colors represents the number of required channels.

FIGS. 4 and 5 respectively show results of coloring obtained by the allocation unit 103 coloring the interference overlapping map before and after adjustment, where different filling forms are used to represent the results of coloring. It can be seen that there are four filling forms in FIG. 4, that is, a black filling form, a white filling form, a diagonal line filling form and a dot filling form, so that four primary channels are required. In the case that there are only three available channels, the number of channels is insufficient. As shown in FIG. 5, the adjusted interference overlapping map has only three filling forms: the black filling form, the white filling form, and the diagonal line filling form, and the edge e8 between v8 and v9 is removed, so that v8 and v9 are filled with the same form, that is, v8 and v9 can be allocated with the same channel. In the case of FIG. 5, the number of required channels is equal to the number of available channels, both of which are 3, so that spectrum allocation can be performed effectively.

In addition, it should be noted that when there are multiple terminal devices in the coverage overlapping region, the gap between the communication quality and its threshold is the sum of the gap for each of the multiple terminal devices. For example, in the case where the communication quality is expressed by SINR, the gap is the SINR margin, which is the sum of the difference between the SINR threshold and the measured SINR value of each terminal device in the coverage overlapping region.

In another example, the parameter is a density of the terminal devices in the coverage overlapping region of the resource utilization systems represented by the two connection points of each edge, and the adjustment unit 102 is configured to select an edge corresponding to the minimum density as the edge to be removed. The minimum density means that the number of terminal devices affected by the removal of the edge is minimum, so that the possible effect would be minimum.

FIG. 6 is a schematic diagram showing spatial distribution of coverage regions of resource utilization systems. Similar to FIG. 2, the resource utilization system includes CBSD and EUD. FIG. 7 shows the interference overlapping map constructed based on FIG. 6. A density of EUDs in the coverage overlapping region may be estimated based on a sector area of the coverage range of the CBSD and the number of EUDs, as shown in the following equation (3):

$$\rho = N_e / S_e$$

where $N_e$ represents the number of EUDs in the coverage overlapping region of the two connecting points linked by the edge e; $S_e$ represents the sector area of the coverage overlapping region. Taking FIG. 6 as an example, assuming that each CBSD may be divided into three sectors, and the area of each sector is S, the density of EUDs corresponding to each edge of the interference overlapping map shown in FIG. 7 is as shown in FIG. 8. The sector area is calculated based on the number of sectors occupied by the coverage overlapping regions of two CBSDs in the coverage regions of the two CBSDs, that is, the number is multiplied by the area of each sector. In a case that the numbers of sectors occupied by the coverage overlapping regions of the two CBSDs in the coverage regions of the two CBSDs are different, the sector area may be calculated based on the larger number of sectors or the smaller number of sectors. For example, if the coverage overlapping regions of two CBSDs occupy one sector in the coverage region of one CBSD, and occupy two sectors in the coverage region of the other CBSD, the density may be calculated based on areas of the two sectors.

According to FIG. 8, the minimum density is ½S, and the corresponding edge is e3. Therefore, the adjustment unit 102 selects e3 as the edge to be removed. Similarly, FIG. 8 also shows the result of coloring by the allocation unit 103 on the interference overlapping map before adjustment. After removing the edge e3, the allocation unit 103 re-colors the adjusted interference overlapping map, and determines whether the predetermined condition is satisfied.

In the above example, all terminal devices in the coverage overlapping region are taken into account when calculating the density of the terminal devices. In addition, density of only terminal devices of which the communication quality in the coverage overlapping region is lower than a predetermined level may also be considered. In this case, in the above calculation, $N_e$ represents the number of EUDs of which communication quality in the coverage overlapping region of the two connection points linked by the edge e is lower than a predetermined level.

Alternatively, the edge to be removed may be selected based on the number of EUDs in the coverage overlapping region rather than calculating the density. In this case, the parameter is the number of terminal devices in the coverage overlapping regions of the resource utilization systems represented by the two connection points of each edge, and the adjustment unit 102 is configured to select the edge corresponding to the minimum number as the edge to be removed. The number of EUDs in the coverage overlapping region may be determined by the EUD measuring the physical cell ID (PCI) of neighboring cells. Other operations are performed similarly, which are not repeated here.

In another example, the parameter is the number of resource utilization systems represented by the two connection points of each edge, and the adjustment unit 102 is configured to select the edge corresponding to the minimum number as the edge to be removed.

As described above, in the constructed interference overlapping map, the number of resource utilization systems represented by each connection point is saved as a parameter N of the interference overlapping map. Therefore, the adjustment unit 102 may add the number of resource utilization systems corresponding to the two connection points of each edge, and select the edge corresponding to the minimum sum to perform the removing operation.

Figure 9:
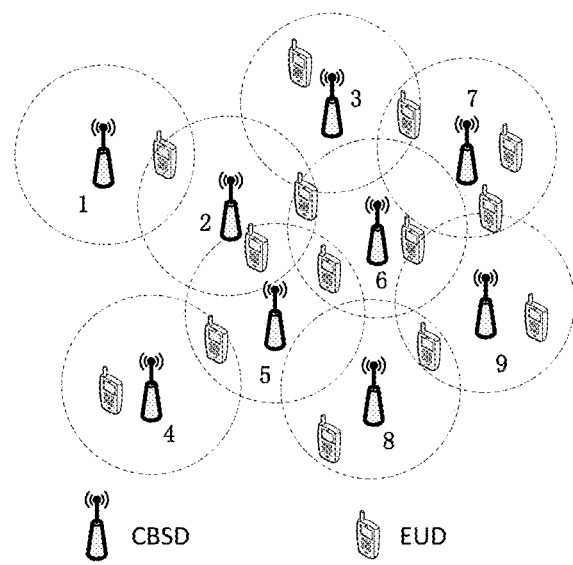
FIG. 9 is a schematic diagram showing spatial distribution of coverage regions of resource utilization systems.
Figure 10:
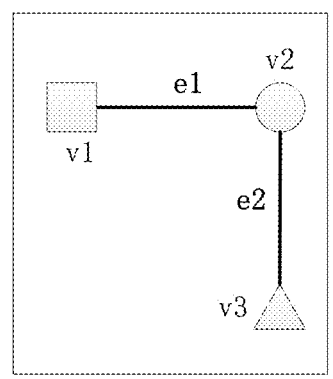
FIG. 10 shows an interference overlapping map constructed based on FIG. 9.

FIG. 9 is a schematic diagram showing spatial distribution of coverage regions of the resource utilization systems. Similar to FIG. 2, the resource utilization system includes CBSD and EUD. FIG. 10 shows the interference overlapping map constructed based on FIG. 9.

FIG. 10 shows three connection points V={v1, v2, v3} (which are represented by square, circle and triangle respectively), two edges E={e1, e2}, the number of CBSDs in each connection point is N={3, 4, 2}. Specifically, v1 represents CBSDs 1, 2 and 3, v2 represents CBSDs 4, 5, 6 and 7, and v3 represents CBSDs 8 and 9. Therefore, the number of CBSDs corresponding to the edge e1 is 3+4=7, and the number of CBSDs corresponding to the edge e2 is 4+2=6. The adjustment unit 102 selects the edge e2 as the edge to be removed.

In addition, in another example, the parameter may also be a ratio of the resource utilization systems which have interference relationship in the two common channel groups respectively represented by two connection points of each edge, and the adjustment unit 102 selects the edge corresponding to the minimum ratio as the edge to be removed.

Still taking FIG. 9 as an example, the CBSD labeled 1 in the connection point v1 has no mutual interference relationship with all the CBSDs in the connection point v2, the number of CBSDs actually affected in the connection point v1 is 2, and similarly, the number of CBSDs actually affected in connection point v2 is 3. Therefore, the number of CBSDs actually affected corresponding to edge e1 is 5 (that is, CBSDs labeled 2, 3, 5, 6, and 7 respectively), and the ratio of the numbers of affected CBSDs to all CBSDs is 5/7=71.4%. For edge e2, the number of CBSDs actually affected is also 5 (that is, CBSDs labeled 5, 6, 7, 8, and 9 respectively), and the ratio of numbers of the affected CBSDs to all CBSDs is 5/6=83.3%. In view of this, the adjustment unit 102 selects the edge e1 as the edge to be removed.

It can be seen that, in the case where the adopted parameters are different, even for the same scenario, the adjustment unit 102 may perform different removing operations.

Subjected to the removing operation of the adjustment unit 102, the obtained final interference overlapping map satisfies the predetermined condition. The allocation unit 103 performs channels/resources allocation based on the interference overlapping map.

As described above, the allocation unit 103 may allocate channels/resources by coloring the interference overlapping map. After coloring, the allocation unit 103 also matches the color with the channel, that is, determines in particular to allocate a channel to which resource utilization systems.

The allocation unit 103 may also take protection of high priority-level users into consideration when performing channels/resources allocation. For example, in the CBRS architecture, the electronic apparatus 100 is used to allocate spectrum resources for GAA users, and the allocation unit 103 needs to consider the transmission restrictions of IA users and PAL users on the GAA users. The transmission restrictions may be expressed by the spectrum unavailability matrix $$UN = [un_{jk}]_{N_{ver} \times N_c},$$

where $un_{jk}$ represents whether the j-th access point can use the k-th available channel, and takes a value of 0 or 1. For example, 0 means that the GAA users will not cause interferences to the IA and PAL users when using this channel, and 1 means that the GAA users will cause interferences to IA and PAL users when using this channel.

The allocation unit 103 also provides a result of the channel/resources allocation to each resource utilization system. Although not shown in the figures, the electronic apparatus 100 may further include a communication unit for performing communication with the resource utilization systems. The result of the channel/resources allocation may be sent to the resource utilization system via the communication unit. Further, the electronic apparatus 100 also receives various information such as EUD in the overlapping region, communication quality of the EUD required during the execution process of the operations via the communication unit.

The electronic apparatus 100 according to the present embodiment may obtain one or more of the following effects by appropriately removing one or more edges in the interference overlapping map: effectively improving the spectrum utilization efficiency; ensuring communication quality of each resource utilization system; improving fairness; improving the effectiveness of system resource allocation; protecting primary users and high priority-level users from harmful interferences.

Second Embodiment

Figure 11:
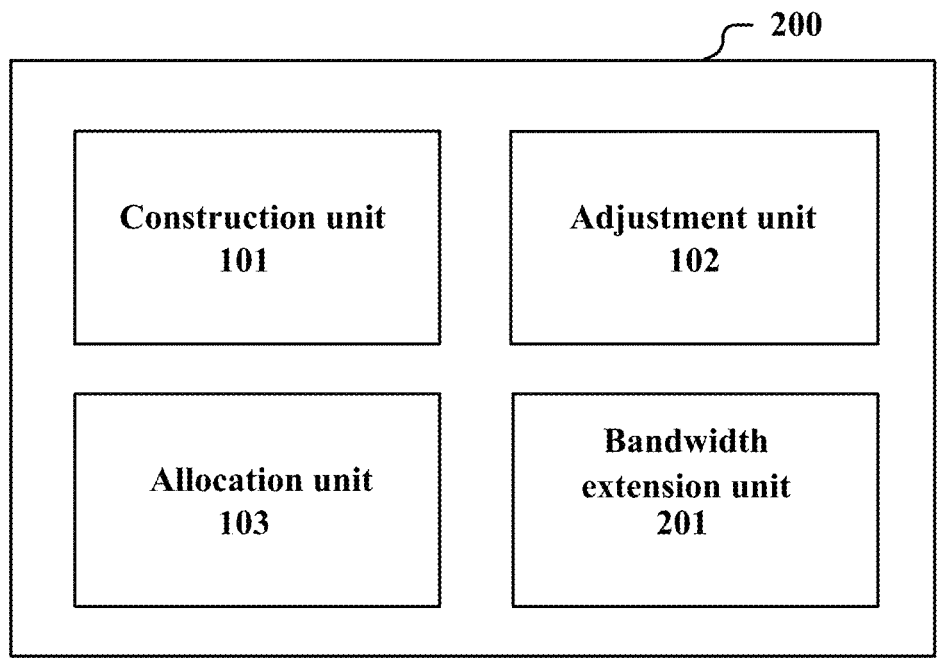
FIG. 11 is a block diagram showing functional modules of an electronic apparatus for wireless communications according to another embodiment of the present disclosure.

FIG. 11 is a block diagram showing functional modules of an electronic apparatus 200 for wireless communications according to another embodiment of the present disclosure. Besides the units shown in FIG. 1, the electronic apparatus 200 further includes a bandwidth extension unit 201 configured to perform bandwidth extension on one or more of the resource utilization systems.

The bandwidth extension unit 201 may be implemented by one or more processing circuits, which may be implemented as chips, for example.

In the first embodiment, the allocation unit 103 performs channel/resources allocation for each resource utilization system. This channel/resources allocation may be referred to as primary channel allocation. Since the spectrum requirements of the resource utilization systems are different (or, the numbers of required channels are different), after the primary channel allocation is performed, there may be a case that the number of channels for some resource utilization systems is insufficient and primary channels of some resource utilization systems are in a redundant state (that is, the channels are allocated but are not utilized).

In order to meet its own spectrum requirements, a resource utilization system with insufficient number of channels may transmit a request for bandwidth extension to the central management apparatus. Alternatively, the central management apparatus, specifically, for example, the bandwidth extension unit 201 performs bandwidth extension for the resource utilization system with insufficient number of channels under certain conditions. Bandwidth extension refers to, for example, allocating an additional channel other than the primary channel to the resource utilization system. The additional channel may be idle or may have been allocated to another resource utilization system. In the case that the additional channel have been allocated to another resource utilization system, as long as the resource utilization system will not cause any interferences to the other resource utilization system to which the additional channel is allocated when using the additional channel, the additional channel may be used for bandwidth extension of the resource utilization system. In other words, the bandwidth extension includes the resource utilization system utilizing the primary channel of a resource utilization system that does not have an interference relationship with the resource utilization system, that is, the multiplexing of the spectrum from a perspective of geographical position.

As described above, although the primary channel in the redundant state is allocated, the primary channel is not utilized. In order to make full use of the primary channel in the redundant state, the bandwidth extension unit 201 may be configured to implement bandwidth extension by allocating the redundant primary channel of the resource utilization system to the resource utilization system with insufficient spectrum resources. Hereinafter, this kind of bandwidth extension is also referred to as primary channel re-equalization. For example, the bandwidth extension unit 201 may determine the primary channel in the redundant state by querying the spectrum utilization conditions of each resource utilization system, and determine the resource utilization system with insufficient spectrum resources.

In the bandwidth extension manner (primary channel re-equalization) that reuses the primary channel in the redundant state, the spectrum utilization efficiency can be improved, thereby making full use of spectrum resources. In addition, this also prevents a resource utilization system with insufficient spectrum resources from repeatedly performing spectrum request, thereby reducing the system overhead. It can be understood that this is only an example, and the bandwidth extension unit 201 may also perform bandwidth extension in various other ways.

In an example, the bandwidth extension unit 201 is configured to calculate an overall spectrum satisfaction degree of a network, and perform bandwidth extension in a case that the overall spectrum satisfaction degree is lower than a threshold. For example, the overall spectrum satisfaction degree of the network is a satisfaction degree to which the allocated spectrum resources satisfy the spectrum requirement of the resource utilization system.

The bandwidth extension unit 201 may calculate the spectrum satisfaction degree of each resource utilization system based on the channel allocation status for the resource utilization system and channel requirement of the resource utilization system, and calculate the overall spectrum satisfaction degree of the network based on the calculated spectrum satisfaction degree. The spectrum requirement of the resource utilization system and spectrum allocation result may be stored in a storage device of the electronic apparatus 200.

For example, a spectrum satisfaction degree $s_i$ of an i-th resource utilization system may be defined as follows: in a case that the allocated primary channels are more than the required primary channels, $s_i$ is 1; in a case that the allocated primary channels are less than the required channels, and the bandwidth extension is performed, $s_i$ is expressed by:

$$s_i = \frac{p_i + e_i}{r_i} \in (0,1] \qquad (4)$$

where $r_i$ represents the number of channels required by the i-th resource utilization system, $p_i$ represents the number of primary channels allocated for the i-th resource utilization system, and $e_i$ represents the number of channels extended for the i-th resource utilization system.

The overall spectrum satisfaction degree S of the network may be calculated according to the following equation (5):

$$S = \frac{\sum_{i=1}^{N} s_i}{N} \qquad (5)$$

where N represents the total number of resource utilization systems.

In addition, the spectrum satisfaction degree of each resource utilization system may also be calculated and reported to the electronic apparatus 200 by the resource utilization system itself. In this case, the bandwidth extension unit 201 is configured to acquire the spectrum satisfaction degree of each resource utilization system from the resource utilization system and calculate the overall spectrum satisfaction degree of the network based on the acquired spectrum satisfaction degree.

The overall spectrum satisfaction degree of the network may indicate whether the current spectrum allocation is reasonable, which may be used to determine whether to perform bandwidth extension as described above, or may be used as an indication for the adjustment unit 102 to adjust the interference overlapping map. For example, in a case that the overall spectrum satisfaction degree is lower than a certain level, one or more edges of the interference overlapping map may be removed with the method described in the first embodiment, such that the allocation unit 103 re-performs the primary channel allocation.

When performing bandwidth extension, the central processing device determines a specific scheme for bandwidth extension. For example, in a case that two or more resource utilization systems request the same extension spectrum for bandwidth extension, the bandwidth extension unit 201 is configured to select the resource utilization system to which the extension spectrum is to be allocated based on one or more of the following: the spectrum satisfaction degree of resource utilization system; and requesting time.

Specifically, the bandwidth extension unit 201 may allocate the extension spectrum to a resource utilization system with a low spectrum satisfaction degree, thereby improving the overall spectrum satisfaction degree of the network. In a case that the spectrum satisfaction degrees of the resource utilization systems requesting the same extension spectrum is close to each other, the bandwidth extension unit 201 may allocate the extension spectrum to the resource utilization system with an earlier requesting time to reflect the fairness of the bandwidth extension. Alternatively, the bandwidth extension unit 201 may determine to allocate the extension spectrum to which resource utilization system only according to the requesting time.

In addition, the bandwidth extension unit 201 is also configured to take protection to high priority-level users into consideration when performing bandwidth extension. For example, in a case that there is an overlapping region between the coverage range of the resource utilization system requesting extension spectrum and a protection region of the high priority-level users, and the requested extension spectrum overlaps with the spectrum used by high priority-level users, the bandwidth extension unit 201 will not allow the resource utilization system to use the extension spectrum for bandwidth extension.

It should be noted that although the bandwidth extension unit is described in this embodiment in conjunction with the first embodiment, the present disclosure is not limited thereto, and the bandwidth extension unit may be combined with another electronic apparatus that performs primary channel allocation, which is not limited to the electronic apparatus 100 according to the present disclosure. In addition, the bandwidth extension unit may be used individually.

The electronic apparatus 200 according to this embodiment performs the bandwidth extension for the resource utilization system, such that the spectrum utilization efficiency is improved and the system overhead is reduced.

Third Embodiment

Figure 12:
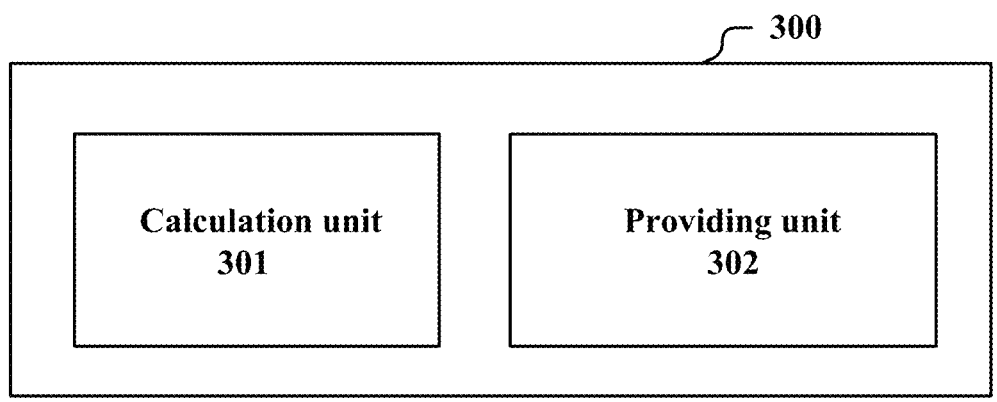
FIG. 12 is a block diagram showing functional modules of an electronic apparatus for wireless communications according to another embodiment of the present disclosure.

FIG. 12 is a block diagram showing functional modules of an electronic apparatus 300 for wireless communications according to another embodiment of the present disclosure. As shown in FIG. 12, the electronic apparatus 300 includes a calculation unit 301 and a providing unit 302. The calculation unit 301 is configured to calculate, based on the number of available spectrum resources allocated by a central management apparatus for a resource utilization system and a spectrum requirement of the resource utilization system, a spectrum satisfaction degree of the resource utilization system. The providing unit 302 is configured to provide the spectrum satisfaction degree to the central management apparatus.

The calculation unit 301 and the providing unit 302 may be implemented by one or more processing circuits, and the processing circuit may be implemented as a chip, for example. Moreover, it should be understood that various functional units in the device shown in FIG. 12 are only logical modules divided according to their specific functions, which is not intended to limit specific implementation manners.

The electronic apparatus 300 is arranged, for example, on a side of the resource utilization system, specifically, may be arranged on a side of the network management apparatus of the resource utilization system, such as on the CBSD.

In this embodiment, the resource utilization systems calculates their respective spectrum satisfaction degrees and provides them to the central management apparatus. For example, the calculation unit 301 may calculate the spectrum satisfaction degree based on a ratio of a sum of the number of primary channels allocated by the central management apparatus to the resource utilization system and the number of the extension channels to the number of required channels. The definition of the spectrum satisfaction degree has been described in detail in the second embodiment, and will not be repeated here.

In an example, the providing unit 302 is further configured to request bandwidth extension to the central management apparatus in a case that the spectrum satisfaction degree is lower than a predetermined threshold. For example, the request may also include a target channel to be extended.

In addition, the providing unit 302 is further configured to instruct the terminal device to perform one or more of the following: detecting and reporting of an identifier of the resource utilization system; and measuring and reporting of communication quality. For example, the providing unit 302 may provide the information reported by the terminal device to the central management apparatus for generating and adjusting of the interference overlapping map.

For example, the providing unit 302 may transmit measurement configuration information to the terminal devices of the resource utilization system, and in response to the measurement configuration information, the terminal device reports a list of resource utilization system identifiers (such as cell IDs) detected by the terminal device to the network management apparatus that provides services for it. The providing unit 302 of the present disclosure may determine whether the terminal device is located in a coverage overlapping region with other resource utilization systems based on the list. For the terminal device located in the coverage overlapping region, the providing unit 302 may further transmit an SINR measurement instruction to the terminal device.

In addition, the providing unit 302 may also report a parameter related to mutual interferences between the resource utilization systems to the central management apparatus. The parameter includes one or more of the following: a gap between communication quality of a terminal device in an overlapping region of the coverage region of the present resource utilization system with the coverage region of another resource utilization system and a threshold of the communication quality of the terminal device; the number of the terminal devices in the overlapping region; and the number of the terminal devices of which communication quality is lower than a predetermined level in the overlapping region. For example, in a case that the communication quality of the terminal device is expressed by the measured SINR, the providing unit 302 may provide the central management apparatus with the SINR margin described in the first embodiment or the measurement result of the SINR.

Although not shown in the figure, the electronic apparatus 300 may further include a communication unit for performing communication with the central management apparatus and the terminal devices to transmit and receive various related information and signaling.

For ease of understanding, the CBRS architecture is taken as an example to describe the information procedure between the central management apparatus, the base station, and the terminal device applying the technology of the present disclosure. The central management apparatus is, for example, SAS or CxM, the base station is, for example, CBSD, and the terminal device is EUD.

Figure 13:
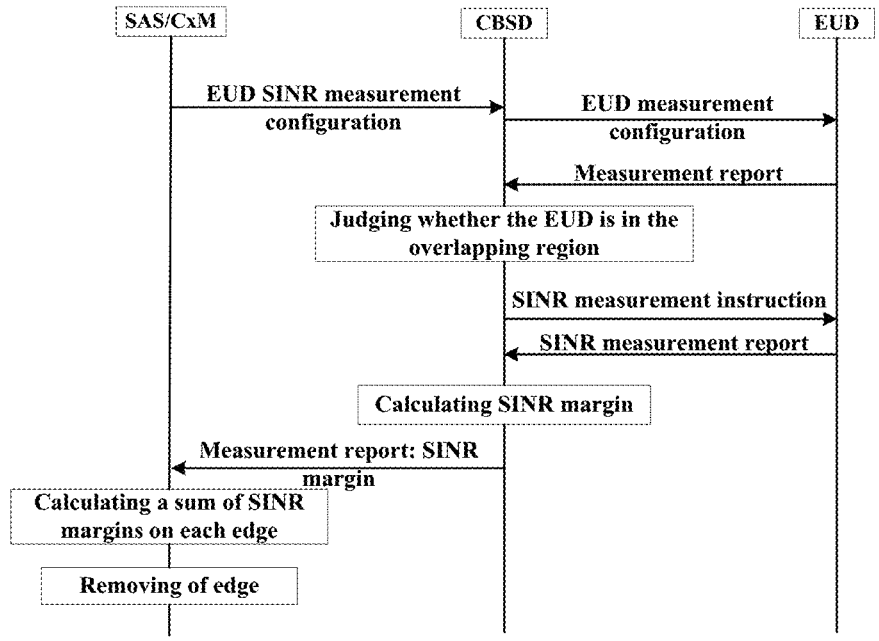
FIG. 13 is a schematic diagram showing an information procedure between SAS/CxM, CBSD and EUD.

FIG. 13 is a schematic diagram showing an information procedure between SAS/CxM, CBSD, and EUD, in an example in which the central management apparatus selects the edge to be removed in the interference overlapping map according to the SINR margin. As shown in FIG. 13, SAS/CxM transmits to the CBSD an instruction for reporting information of the SINR of EUD in the coverage overlapping region between the CBSD with other CBSDs. The CBSD then transmits EUD measurement configuration signaling to the EUD it serves (the signaling is similar to Radio Resource Control (RRC) signaling in LTE, for example), and the EUD then transmits its measurement report to the CBSD, which includes a list of cell IDs that the EUD can detect. Based on the measurement report, the CBSD determines whether the EUD is located in the coverage overlapping region of the present CBSD and the other CBSDs. For example, when EUD can detect the ID of the serving cell and the ID of a neighbor cell, it is determined that the EUD is located in an overlapping region between the local cell and the neighbor cell. For the EUD located in the overlapping region, the CBSD transmits an SINR measurement instruction to the EUD, and the EUD transmits an SINR measurement report to the CBSD after the measurement. For example, the CBSD may calculate the SINR margin of the EUD based on equation (2) and report it to SAS/CxM. Next, the SAS/CxM calculates a sum of the SINR margins on each edge, and selects an edge corresponding to the minimum sum for removal, for example. The signaling for the SAS/CxM to configure or instruct the measurement and/or reporting of the CBSD and the EUD may be referred to as measurement configuration signaling. The measurement configuration signaling from the SAS/CxM may be transmitted to the CBSD and the EUD in a spectrum query response, a spectrum permission response or a heartbeat response. The measurement report signaling of the CBSD and EUD may be transmitted to the SAS/CxM in a spectrum permission request or a heartbeat request.

In addition, the steps in the information procedure in FIG. 13 before the CBSD reports the SINR margin may also be used as a construction operation of the interference overlapping map. In a case of the construction operation, the SINR margin may not be calculated, and the SINR measurement result may be directly reported to the SAS/CxM.

Figure 14:
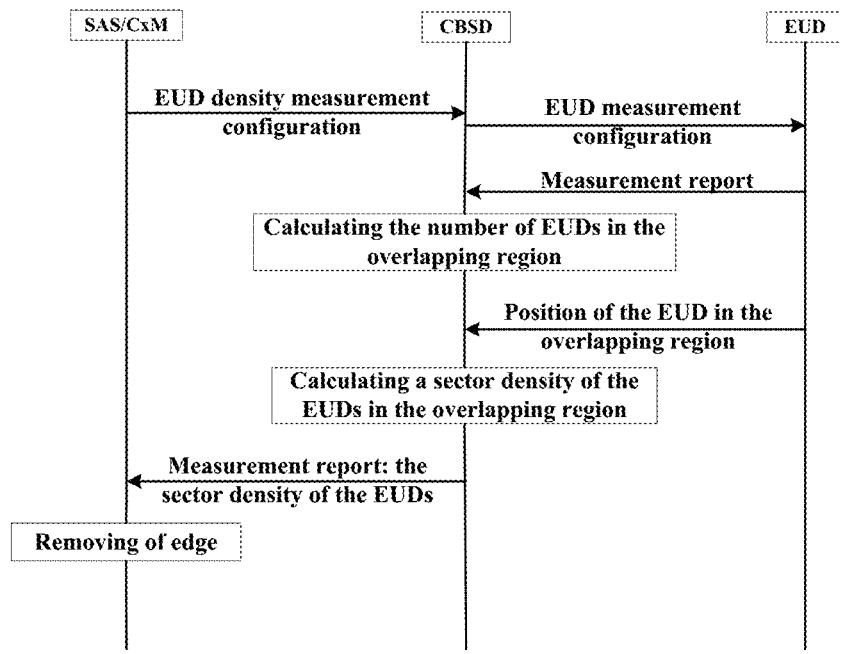
FIG. 14 is a schematic diagram showing another information procedure between SAS/CxM, CBSD and EUD.

FIG. 14 is a schematic diagram showing an information procedure between SAS/CxM, CBSD, and EUD in an example in which the central management apparatus selects an edge to be removed in the interference overlapping map according to a density of the EUDs.

As shown in FIG. 14, the SAS/CxM transmits to the CBSD an instruction for reporting the information of the density of the EUDs in an overlapping region between the CBSD with other CBSDs. The CBSD then transmits EUD measurement configuration signaling to the EUD it serves (the signaling is similar to Radio Resource Control (RRC) signaling in LTE, for example), the EUD then transmits its measurement report to the CBSD, which includes a list of cell IDs that the EUD can detect. Based on the measurement report, the CBSD calculates the number of EUDs in the coverage overlapping region. Then, the EUD in the coverage overlapping region reports its position information to the CBSD serving it. For example, the CBSD calculates a sector density based on its sector area and the number of EUDs in the sector, and reports the sector density to the SAS/CxM. Next, for example, the SAS/CxM selects an edge corresponding to the minimum sector density for removal.

Figure 15:
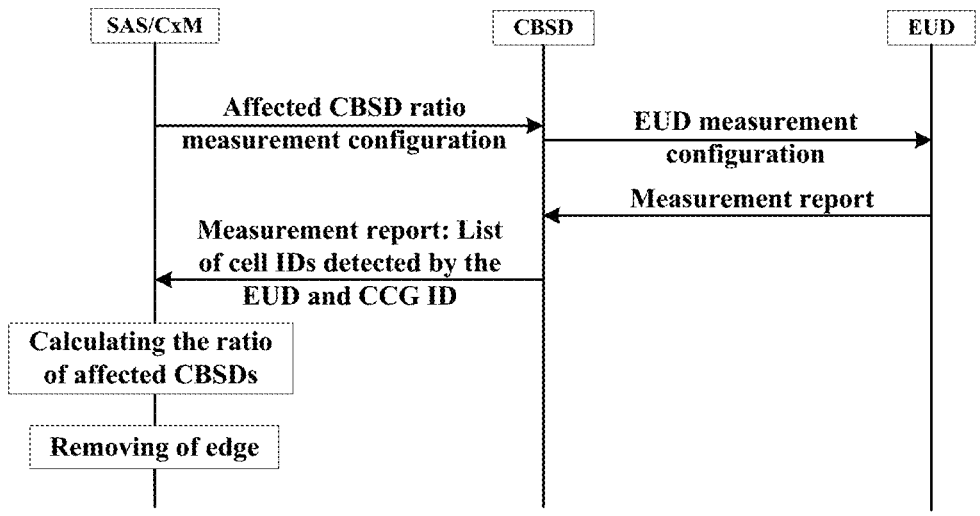
FIG. 15 is a schematic diagram showing another information procedure between SAS/CxM, CBSD and EUD.

FIG. 15 is a schematic diagram showing an information procedure between SAS/CxM, CBSD, and EUD in an example where the central management apparatus selects an edge to be removed in the interference overlapping map according to a ratio of the affected CBSDs.

As shown in FIG. 15, the SAS/CxM transmits to the CBSD an instruction for reporting ratio of the affected CBSDs measurement configuration. The CBSD then transmits EUD measurement configuration signaling to the EUD it serves (this signaling is similar to the Radio Resource Control (RRC) signaling in LTE, for example), the EUD then transmits its measurement report to the CBSD, which includes a list of cell IDs that the EUD can detect. The CBSD reports a list of cell IDs detected by the EUD and the CCG IDs to the SAS/CxM. The SAS/CxM determines CBSDs with an overlapping coverage range and different CCG IDs as affected CBSDs, counts the number of affected CBSDs on each edge, and then calculates the ratio of affected CBSD, such as selecting an edge corresponding to the minimum ratio for removal. In addition, in the case that SAS/CxM has obtained the information of the CCG ID of the CBSD, the CBSD may not report the CCG ID in this information procedure.

Figure 16:
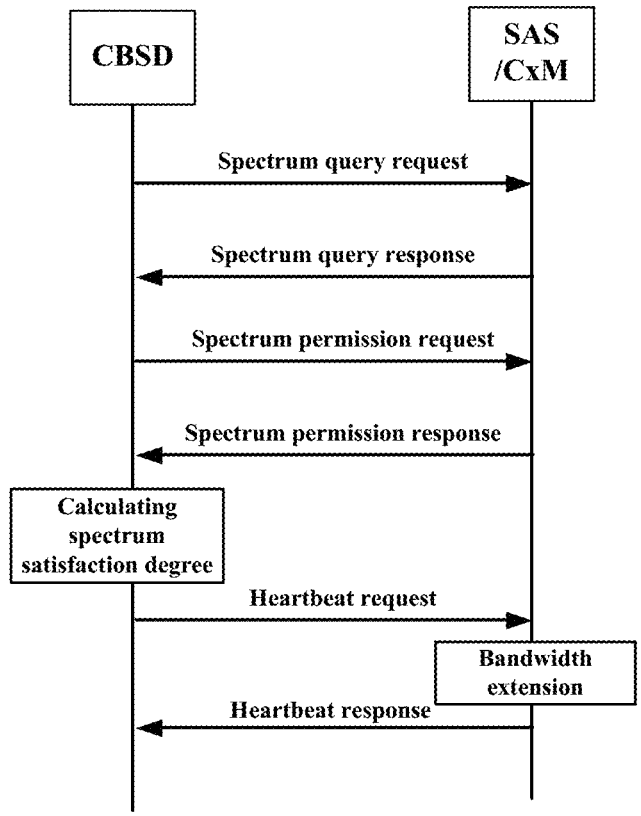
FIG. 16 is a schematic diagram showing an information procedure between CBSD and SAS/CxM.

FIG. 16 is a schematic diagram showing an information procedure between CBSD and SAS/CxM in the operations of calculating spectrum satisfaction degree and performing bandwidth extension.

As shown in FIG. 16, the CBSD transmits spectrum query request information to the SAS/CxM. The spectrum query request information includes, for example, CBSD grouping information such as CBSD ID, ICG ID. The SAS/CxM acquires the spectrum query request information and transmits a spectrum query response to the CBSD. The CBSD transmits spectrum permission request information to the SAS/CxM, which includes spectrum requirement of the CBSD such as the number of required channels. The SAS/CxM constructs the interference overlapping map and performs the primary channel allocation (for example, it may also perform the adjustment of the interference overlapping map) and transmits the spectrum permission response to the CBSD, which includes the information of the allocated primary channel. In an example, the spectrum permission request information also includes the requested spectrum resources such as the channels. If the allocated spectrum resource is inconsistent with the requested spectrum resource, the SAS/CxM rejects the spectrum request in the spectrum response and suggests a new spectrum resource such as a new channel. The CBSD transmits a new spectrum permission request according to the suggestion and acquires a spectrum permission response. The CBSD calculates the spectrum satisfaction degree based on the allocated primary channel and the number of channels required by itself, and transmits heartbeat request information to the SAS/CxM, which includes the calculated spectrum satisfaction degree information. The SAS/CxM performs bandwidth extension for a CBSD with a low spectrum satisfaction degree and transmits a heartbeat response to the CBSD, which includes information of the allocated extension spectrum.

Figure 17:
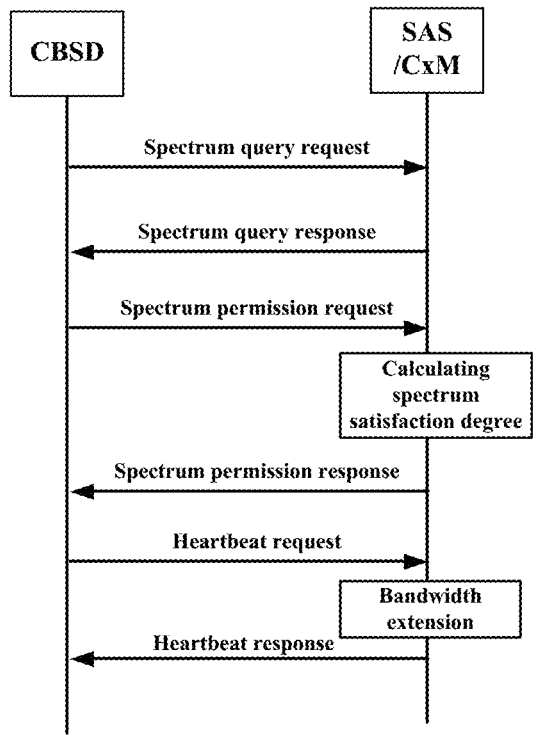
FIG. 17 is a schematic diagram showing another information procedure between CBSD and SAS/CxM.

FIG. 17 is a schematic diagram showing another information procedure between CBSD and SAS/CxM in the operation of calculating spectrum satisfaction degree and performing bandwidth extension. The difference between FIG. 17 and FIG. 16 is that the SAS/CxM calculates the spectrum satisfaction degree. Accordingly, the CBSD does not need to include spectrum satisfaction degree information in the heartbeat request information, but only include the bandwidth extension request. The other steps are the same as in FIG. 16 and will not be repeated here.

It should be understood that the above-described various information procedures are only exemplary and not restrictive. Those skilled in the art can make appropriate modifications as needed in actual applications, and these modifications should fall within the scope of the present disclosure.

Fourth Embodiment

In the process of describing the electronic apparatus for wireless communications in the embodiments described above, obviously, some processing and methods are also disclosed. Hereinafter, an overview of the methods is given without repeating some details disclosed above. However, it should be noted that, although the methods are disclosed in a process of describing the electronic apparatus for wireless communications, the methods do not certainly employ or are not certainly executed by the aforementioned components. For example, the embodiments of the electronic apparatus for wireless communications may be partially or completely implemented with hardware and/or firmware, the methods for wireless communications described below may be executed by a computer-executable program completely, although the hardware and/or firmware of the electronic apparatus for wireless communications can also be used in the methods.

Figure 18:
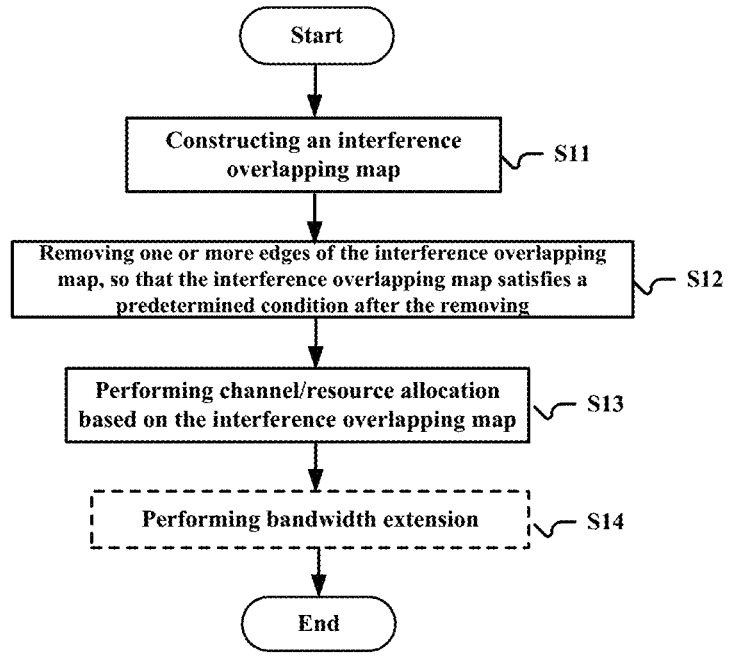
FIG. 18 is a flowchart of a method for wireless communications according to an embodiment of the present disclosure.

FIG. 18 shows a flowchart of a method for wireless communications according to an embodiment of the present disclosure. The method includes: constructing, based on interference/co-existence relationship between resource utilization systems within a management range, an interference overlapping map (S11), a connection point of which represents one or more resource utilization systems, and an edge of which represents that there are interferences between the resource utilization systems represented by two connections points of the edge; removing one or more edges of the interference overlapping map, so that the interference overlapping map satisfies a predetermined condition after the removing (S12); and performing channel/resources allocation based on the adjusted interference overlapping map (S13).

For example, in step S11, it may be determined whether there are interferences between the first resource utilization system and the second resource utilization system based on one of the following: whether there is a terminal device in a coverage overlapping region between the first resource utilization system and the second resource utilization system; and whether there is a terminal device of which communication quality is lower than a predetermined level in a coverage overlapping region between the first resource utilization system and the second resource utilization system.

Exemplarily, in a case that there is at least one terminal device of which communication quality is lower than a predetermined level in the coverage overlapping region, it is determined that there are interferences between the first resource utilization system and the second resource utilization system, an edge is linked between a first connection point corresponding to the first resource utilization system and a second connection point corresponding to the second resource utilization system in the interference overlapping map. The communication quality of the terminal device may be expressed by the signal-to-interference and noise ratio of the terminal device.

In addition, when constructing an interference overlapping map, all members of the same common channel group may be represented by a connection point, and the number of resource utilization systems represented by each connection point may be used as a parameter of the interference overlapping map.

Figure 19:
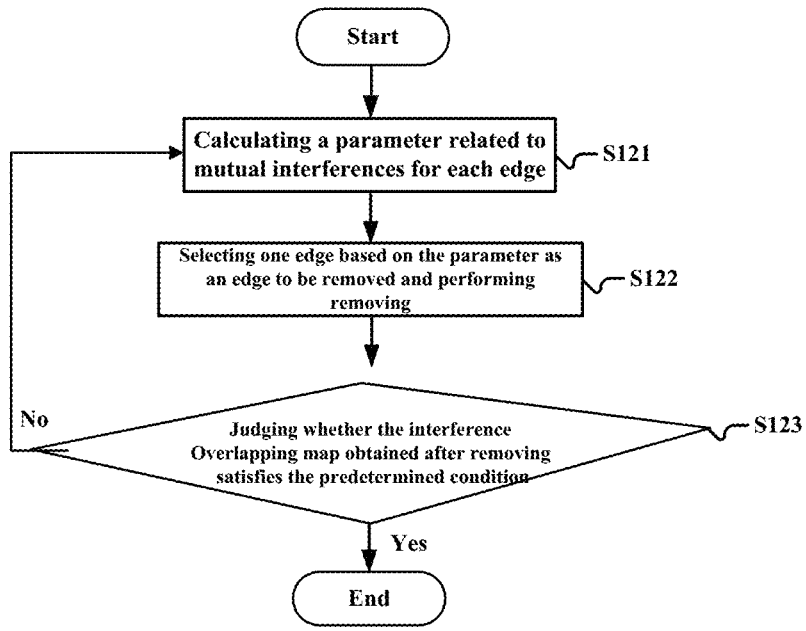
FIG. 19 is a flowchart of sub-steps of step S12 in FIG. 18.

In step S12, one or more edges of the interference overlapping map may be removed, so that the spectrum resource utilization efficiency is optimized or the variation of the network overall interference condition is minimized when performing the channel/resources allocation based on the interference overlapping map after the removing. FIG. 19 shows a schematic flowchart of sub-steps of step S12. Step S12 includes: for each edge in the interference overlapping map, calculating a parameter related to mutual interferences between the resource utilization systems (S121); selecting one edge based on the parameter as an edge to be removed and perform the removing, so that compared with removing other edges, the variation of the network overall interference condition is minimized when performing the channel/resources allocation based on the interference overlapping map after the removing (S122); judging whether the interference overlapping map after the removing satisfies the predetermined condition (S123); and if the predetermined condition is not satisfied, returning to perform step S121 and S122, and if the predetermined condition is satisfied, the operation ends.

In an example, the parameter is a gap between a communication quality of a terminal device in the coverage overlapping region of the resource utilization systems represented by the two connection points of each edge and a threshold of the communication quality of the terminal device. In step S122, an edge corresponding to a terminal device with the minimum gap is selected as the edge to be removed. If there are multiple terminal devices in the coverage overlapping region, the gap is a sum of the gap for each of the multiple terminal devices.

In another example, the parameter is a density of the terminal devices in the coverage overlapping region of the resource utilization systems represented by the two connection points of each edge, and in step S122, an edge corresponding to the minimum density is selected as the edge to be removed.

In another example, the parameter is a density of terminal devices of which communication quality is lower than a predetermined level in the coverage overlapping region of the resource utilization systems represented by the two connection points of each edge, and in step S122, an edge corresponding to the minimum density is selected as the edge to be removed.

In another example, the parameter is the number of the resource utilization systems represented by two connection points of each edge, and in step S122, an edge corresponding to the minimum number is selected as the edge to be removed.

In addition, the parameter may also be a ratio of the resource utilization systems which have interference relationship in the two CCGs respectively represented by two connection points of each edge, and in step S122, an edge corresponding to the minimum ratio is selected as the edge to be removed.

For example, the predetermined condition may be that the number of required channels determined based on the interference overlapping map is not greater than the number of available channels.

In step S13, the interference overlapping map may be colored, and channel/resources allocation may be performed based on the result of the coloring. In addition, protection of high priority-level users may also be taken into consideration when performing the channel/resources allocation using the interference overlapping map. Although not shown in the figure, the above method may further include a step of providing a result of the channel/resources allocation to the resource utilization system.

As indicated by the dashed line block in FIG. 18, the above method may further include a step S14: performing bandwidth extension on one or more of the resource utilization systems.

For example, the overall spectrum satisfaction degree of the network may be calculated, and step S14 is performed when the overall spectrum satisfaction degree is lower than a threshold.

The overall spectrum satisfaction degree of the network may be a satisfaction degree to which the allocated spectrum resources satisfy the spectrum requirements of the resource utilization systems.

The central management apparatus may calculate the spectrum satisfaction degree of each resource utilization system based on the channel allocation status for the resource utilization system and the channel requirements of the resource utilization system, and calculate the overall spectrum satisfaction degree of the network based on the calculated spectrum satisfaction degrees. The central management apparatus may also acquire the spectrum satisfaction degree of each resource utilization system from the resource utilization system and calculate the overall spectrum satisfaction degree of the network based on the acquired spectrum satisfaction degrees.

In step S14, the bandwidth extension may be implemented by allocating the redundant primary channel of the resource utilization system to a resource utilization system with insufficient spectrum resources.

For example, in a case that two or more resource utilization systems request the same extension spectrum for bandwidth extension, the resource utilization system to which the extension spectrum is allocated is selected based on one or more of the following: the spectrum satisfaction degree of the resource utilization system; and requesting time.

In addition, protection of high priority-level users may also be taken into consideration when performing bandwidth extension.

Figure 20:
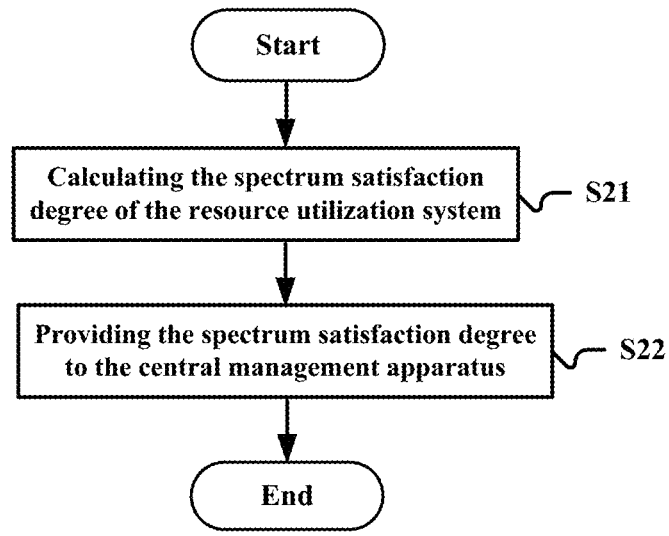
FIG. 20 is a flowchart of a method for wireless communications according to an embodiment of the present disclosure.

FIG. 20 shows a flowchart of a method for wireless communications according to another embodiment of the present disclosure. The method includes: calculating, based on the number of available spectrum resources allocated by a central management apparatus for a resource utilization system and a spectrum requirement of the resource utilization system, a spectrum satisfaction degree of the resource utilization system (S21); and providing the spectrum satisfaction degree to the central management apparatus (S22).

In an example, the above method further includes: requesting bandwidth extension to the central management apparatus when the spectrum satisfaction degree is lower than a predetermined threshold. For example, the spectrum satisfaction degree may be calculated based on a ratio between a sum of the number of primary channels allocated by the central management apparatus for the resource utilization system and the number of the extension channels to the number of required channels.

Although not shown in the figure, the above method may further include: instructing the terminal device to perform one or more of the following: detecting and reporting of an identifier of the resource utilization system; and measuring and reporting of communication quality.

The above method may further include the following steps: reporting a parameter related to mutual interferences between the resource utilization systems to the central management apparatus. The parameter includes one or more of the following: a gap between communication quality of a terminal device in the coverage overlapping region of the present resource utilization system with another resource utilization system and a threshold of the communication quality of the terminal device; the number of the terminal devices in the coverage overlapping region; and the number of the terminal devices of which communication quality is lower than a predetermined level in the coverage overlapping region.

Note that the above methods may be used in combination with each other or individually, which have been described in detail in the first to third embodiments and will not be repeated herein.

In order to further understand the technical solution in the present disclosure, a simulation example is described below. It should be understood that the simulation example is not intended to limit the present disclosure.

Assuming that the management range of the central management apparatus is 1000 meters×1000 meters, a wireless network containing 8 CBSDs is generated in this region, and each CBSD may be regarded as a connection point in the interference overlapping map with a coverage radius of 100 meters. The total number of available channels is set to 6.

Figures 21, 22, 23:
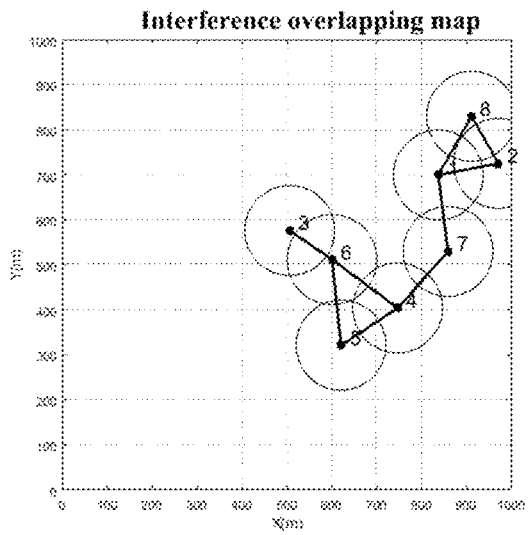
FIG. 21 shows an interference overlapping map constructed in a simulation as an example.
FIG. 22 shows a result of coloring obtained by coloring the interference overlapping map of FIG. 21.
FIG. 23 shows a result of primary channel allocation in the simulation.

FIG. 21 shows the constructed interference overlapping map. FIG. 22 shows a result of coloring obtained by coloring the interference overlapping map of FIG. 21. Connection points 1, 3 and 4 are colored with the same color (blue), connection points 2, 5 and 7 are colored with the same color (red), and connection points 6 and 8 are colored with the same color (green). Channel allocation may be performed based on the result of coloring, for example, connection points with the same color are allocated with the same primary channel. FIG. 23 shows the status of primary channel allocation.

With regard to bandwidth extension, the CBSD 3 is taken as an example. Since the CBSD 3 has a coverage overlapping region with the CBSD 6, the primary channel (red) of the CBSD 6 cannot be used as an extension channel of the CBSD 3. Since the CBSD 3 has no coverage overlapping region with the CBSDs 2, 5, 7, the primary channels (red) of the CBSDs 2, 5, 7 may be used as the extension channel of a node 3.

With regard to the primary channel re-equalization, that is, re-allocation of the redundant primary channel, the CBSD 5 is taken as an example. The CBSD 5 requires 3 primary channels, and there is coverage overlapping relationship between the CBSD 5 and the CBSD 4 (blue), the CBSD 6 (green), the CBSD 4 requires 1 channel and is allocated with 2 primary channels, and the CBSD 6 requires 2 channels and is allocated with 2 primary channels. In this case, the CBSD 5 is in a state of unsatisfied requirement and CBSD 4 is in a redundant state. With the primary channel re-equalization, the redundant channel of the CBSD 4 may be used by the CBSD 5, thereby improving the spectrum satisfaction degree of the CBSD and improving the spectrum utilization efficiency.

Figure 24:
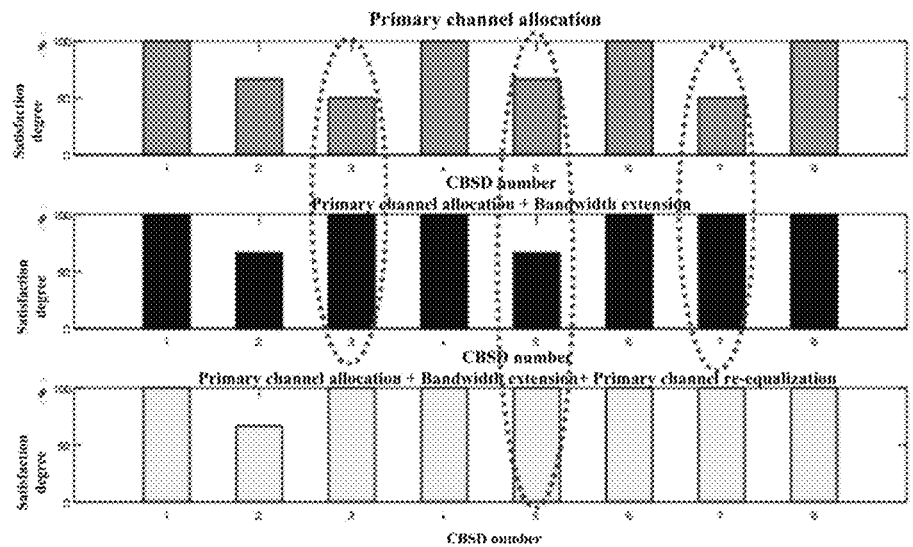
FIG. 24 is a diagram showing a comparison of spectrum satisfaction degrees of CBSDs in three different cases.

The spectrum satisfaction degree of each CBSD is calculated for three cases, that is, a case that primary channel allocation is performed, a case that primary channel allocation and bandwidth extension are performed, and a case that primary channel allocation, bandwidth extension and primary channel re-equalization are performed. FIG. 24 shows a comparison of spectrum satisfaction degrees of the CBSD in three different cases.

In the case that only the primary channel allocation is performed (corresponding to the upper diagram in FIG. 24), the number of primary channels allocated to each CBSD is the same, but the spectrum requirements of each CBSD are different, so the spectrum satisfaction degree also varies greatly. The overall spectrum satisfaction degree of the wireless network is shown in the following equation:

$$S_1 = \frac{\sum_{i=1}^{N} s_i}{N} = 79\% \quad (6)$$

In the case that primary channel allocation and bandwidth extension are performed (corresponding to the middle diagram in FIG. 16), it may be found that the satisfaction degrees of the CBSDs 3 and 7 are significantly improved, and the satisfaction degrees of the CBSDs 2, 5 are still low. The overall spectrum satisfaction degree of the wireless network is shown in the following equation:

$$S_2 = \frac{\sum_{i=1}^{N} s_i}{N} = 92\% \quad (7)$$

In the case that primary channel allocation, bandwidth extension, and primary channel re-equalization are performed (corresponding to the lower diagram in FIG. 16), the allocated but unutilized redundant primary channels are fully utilized. It may be found that the satisfaction degree of the CBSD 5 is greatly improved. Due to the complex interference relationship between CBSDs, the spectrum requirement of the CBSD 2 has not been fully satisfied all the time. The overall spectrum satisfaction degree of the wireless network is shown in the following equation:

$$S_3 = \frac{\sum_{i=1}^{N} s_i}{N} = 96\% \quad (8)$$

It can be seen that with bandwidth extension and primary channel re-equalization, the overall spectrum satisfaction degree of the entire wireless network can be further improved, and spectrum resources can be fully utilized.

The technology of the present disclosure may be applied to various products.

For example, the electronic apparatus 100 and 200 may be implemented as any type of server, such as a tower server, a rack server, and a blade server. The electronic apparatus 100 and 200 may be a control module (such as an integrated circuitry module including a single die, and a card or blade inserted into a slot of a blade server) mounted on a server.

Application Example of the Server

Figure 25:
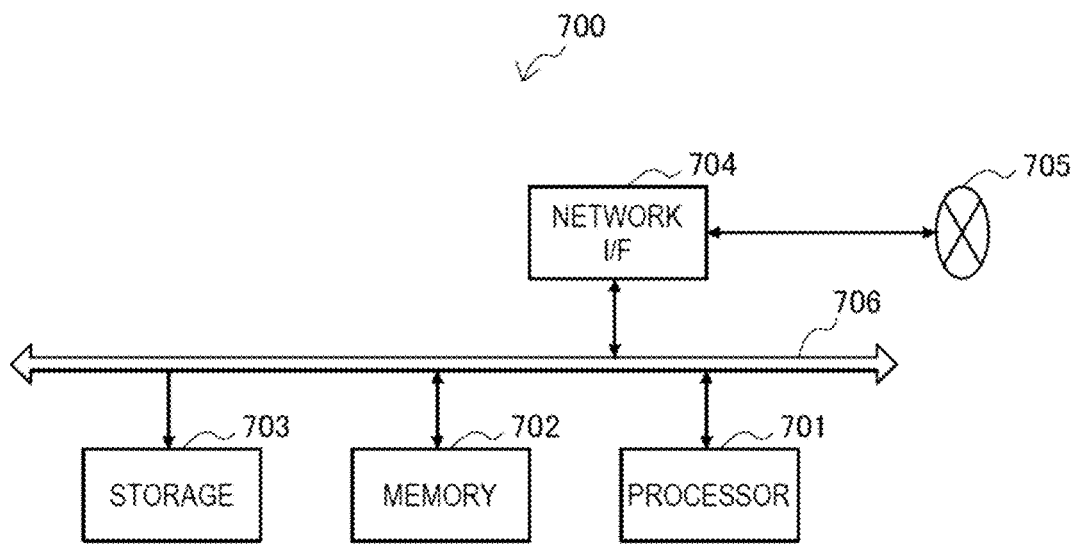
FIG. 25 is a block diagram showing a schematic configuration of a server 700 to which technology according to the present disclosure may be applied.

FIG. 25 is a block diagram showing an example of a schematic configuration of a server 700 to which the technology of the present disclosure may be applied. The server 700 includes a processor 701, a memory 702, a storage 703, a network interface (I/F) 704, and a bus 706.

The processor 701 may be for example a central processing unit (CPU) or a digital signal processor (DSP), and control functions of the server 700. The memory 702 includes a random access memory (RAM) and a read-only memory (ROM), and stores a program that is executed by the processor 701, and data. The storage 703 may include a memory medium, such as a semiconductor memory and a hard disc.

The network interface 704 is a communication interface for connecting the server 700 to a communication network 705. The communication network 705 may be a core network such as an Evolved Packet Core (EPC), or a packet data network (PDN) such as the Internet.

The bus 706 connects the processor 701, the memory 702, the storage 703, and the network interface 704 to each other. The bus 706 may include two or more buses (such as a high-speed bus and a low-speed bus), each of which has different speed.

In the server 700 shown in FIG. 25, the construction unit 101, the adjustment unit 102, the allocation unit 103 described with reference to FIG. 1, the bandwidth extension unit 201 described with reference to FIG. 11, and the like may be implemented by the processor 701. For example, the processor 701 may perform channel/resources allocation based on the adjusted interference overlapping map by executing the functions of the construction unit 101, the adjustment unit 102, and the allocation unit 103, and implement the bandwidth extension of the resource utilization system by executing the functions of the bandwidth extension unit 201.

In addition, the electronic apparatus 300 may be implemented as various base stations. The base station may be implemented as any type of evolved Node B (eNB) or gNB (5G base station). The eNB includes, for example, a macro eNB and a small eNB. The small eNB may be an eNB covering a cell smaller than a macro cell, such as a pico eNB, a micro eNB, and a home (femto) eNB. The case for the gNB is similar to the above. Alternatively, the base station may be implemented as any other type of base station, such as a NodeB and a base transceiver station (BTS). The base station may include a main body (that is also referred to as a base station apparatus) configured to control radio communication, and one or more remote radio heads (RRH) disposed in a different place from the main body. In addition, various types of user equipments may each operate as the base station by temporarily or semi-persistently executing a base station function.

Application Examples Regarding a Base Station

First Application Example

Figure 26:
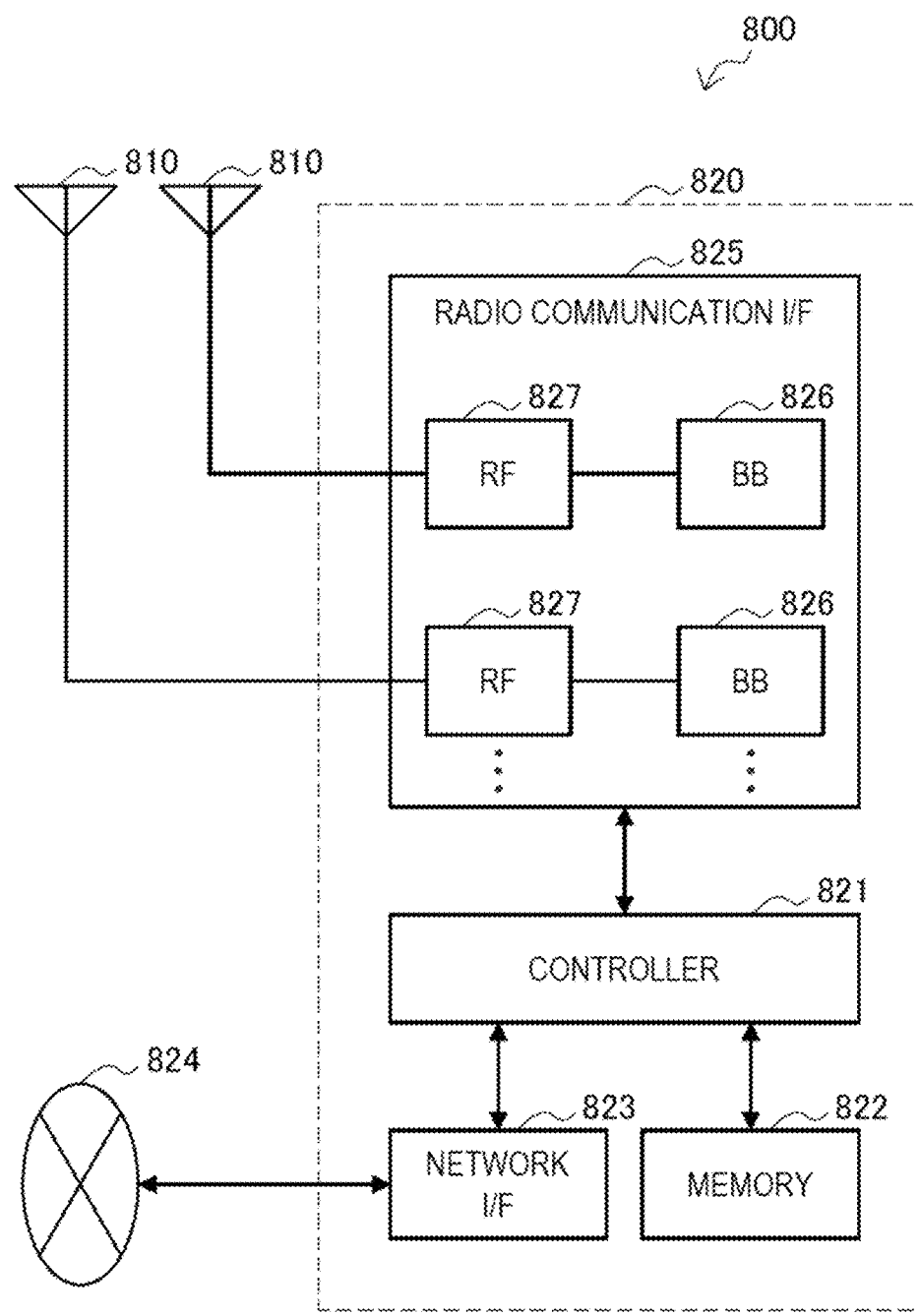
FIG. 26 is a block diagram showing a first example of a schematic configuration of an eNB or a gNB to which the technology of the present disclosure may be applied.

FIG. 26 is a block diagram showing a first example of an exemplary configuration of an eNB or a gNB to which the technology according to the present disclosure may be applied. It should be noted that the following description is given by taking the eNB as an example, which is also applicable to the gNB. An eNB 800 includes one or more antennas 810 and a base station apparatus 820. The base station apparatus 820 and each of the antennas 810 may be connected to each other via a radio frequency (RF) cable.

Each of the antennas 810 includes a single or multiple antennal elements (such as multiple antenna elements included in a multiple-input multiple-output (MIMO) antenna), and is used for the base station apparatus 820 to transmit and receive wireless signals. As shown in FIG. 26, the eNB 800 may include the multiple antennas 810. For example, the multiple antennas 810 may be compatible with multiple frequency bands used by the eNB 800. Although FIG. 26 shows the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control and scheduling. The control may be performed in corporation with an eNB or a core network node in the vicinity. The memory 822 includes a RAM and a ROM, and stores a program executed by the controller 821 and various types of control data (such as terminal list, transmission power data and scheduling data).

The network interface 823 is a communication interface for connecting the base station apparatus 820 to a core network 824. The controller 821 may communicate with a core network node or another eNB via the network interface 823. In this case, the eNB 800, and the core network node or another eNB may be connected to each other via a logic interface (such as an S1 interface and an X2 interface). The network interface 823 may also be a wired communication interface or a wireless communication interface for wireless backhaul. If the network interface 823 is a wireless communication interface, the network interface 823 may use a higher frequency band for wireless communication than that used by the radio communication interface 825.

The radio communication interface 825 supports any cellular communication scheme (such as Long Term Evolution (LTE) and LTE-advanced), and provides wireless connection to a terminal located in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, Media Access Control (MAC), Radio Link Control (RLC), and a Packet Data Convergence Protocol (PDCP)). The BB processor 826 may have a part or all of the above-described logical functions instead of the controller 821. The BB processor 826 may be a memory storing communication control programs, or a module including a processor and a related circuit configured to execute the programs. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives wireless signals via the antenna 810.

As shown in FIG. 26, the radio communication interface 825 may include multiple BB processors 826. For example, multiple BB processors 826 may be compatible with multiple frequency bands used by the eNB 800. As shown in FIG. 26, the radio communication interface 825 may include multiple RF circuits 827. For example, the multiple RF circuits 827 may be compatible with multiple antenna elements. Although an example in which the radio communication interface 825 includes multiple BB processors 826 and multiple RF circuits 827 is shown in FIG. 26, the radio communication interface 825 may include a single BB processor 826 and a single RF circuit 827.

In the eNB 800 shown in FIG. 26, the communication unit of the electronic apparatus 300 may be implemented by the radio communication interface 825. At least part of the functions may also be realized by the controller 821. For example, the controller 821 may calculate and provide the spectrum satisfaction degree by executing functions of the calculation unit 301 and the providing unit 302.

Second Application Example

Figure 27:
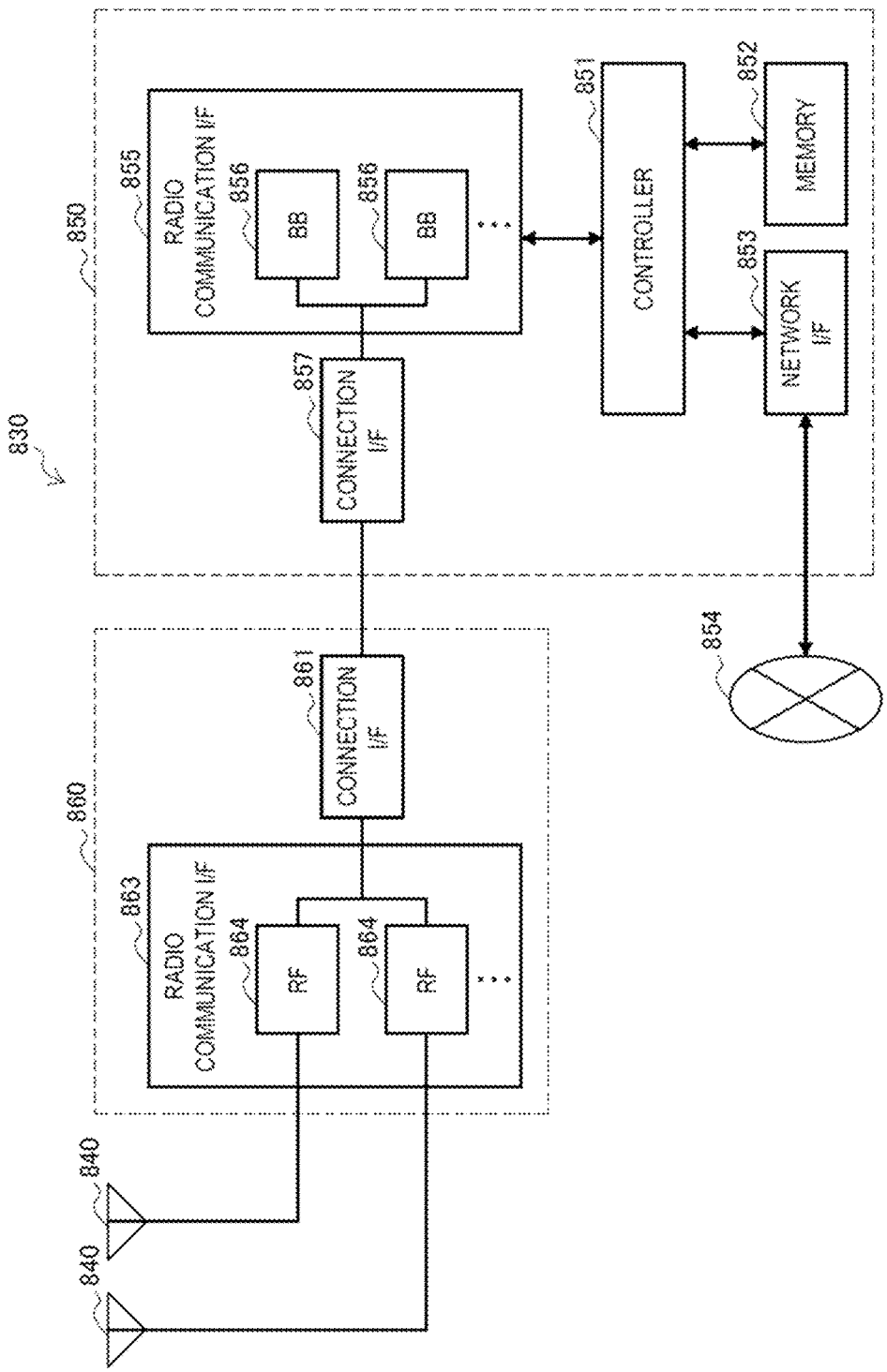
FIG. 27 is a block diagram showing a second example of a schematic configuration of an eNB or a gNB to which the technology of the present disclosure may be applied.

FIG. 27 is a block diagram showing a second example of an exemplary configuration of the eNB or gNB to which the technology according to the present disclosure may be applied. It should be noted that the following description is given by taking the eNB as an example, which is also applied to the gNB. An eNB 830 includes one or more antennas 840, a base station apparatus 850, and an RRH 860. The RRH 860 and each of the antennas 840 may be connected to each other via an RF cable. The base station apparatus 850 and the RRH 860 may be connected to each other via a high speed line such as an optical fiber cable.

Each of the antennas 840 includes a single or multiple antennal elements (such as multiple antenna elements included in an MIMO antenna), and is used for the RRH 860 to transmit and receive wireless signals. As shown in FIG. 27, the eNB 830 may include the multiple antennas 840. For example, the multiple antennas 840 may be compatible with multiple frequency bands used by the eNB 830. Although FIG. 27 shows the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 26.

The radio communication interface 855 supports any cellular communication scheme (such as LTE and LTE-advanced), and provides wireless communication to a terminal located in a sector corresponding to the RRH 860 via the RRH 860 and the antenna 840. The radio communication interface 855 may typically include, for example, a BB processor 856. The BB processor 856 is the same as the BB processor 826 described with reference to FIG. 26, except that the BB processor 856 is connected to an RF circuit 864 of the RRH 860 via the connection interface 857. As show in FIG. 27, the radio communication interface 855 may include the multiple BB processors 856. For example, the multiple BB processors 856 may be compatible with multiple frequency bands used by the eNB 830. Although FIG. 27 shows the example in which the radio communication interface 855 includes the multiple BB processors 856, the radio communication interface 855 may also include a single BB processor 856

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives wireless signals via the antenna 840. The radio communication interface 863 may typically include, for example, the RF circuit 864. The RF circuit 864 may include, for example, a mixer, a filter and an amplifier, and transmits and receives wireless signals via the antenna 840. The radio communication interface 863 may include multiple RF circuits 864, as shown in FIG. 27. For example, the multiple RF circuits 864 may support multiple antenna elements. Although FIG. 27 shows the example in which the radio communication interface 863 includes the multiple RF circuits 864, the radio communication interface 863 may also include a single RF circuit 864.

In the eNB 830 shown in FIG. 27, the communication unit of the electronic apparatus 300 may be implemented by the radio communication interface 825. At least part of the functions may also be realized by the controller 821. For example, the controller 821 may calculate and provide the spectrum satisfaction degree by executing functions of the calculation unit 301 and the providing unit 302.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 2800 shown in FIG. 28) from a storage medium or network, wherein the computer is capable of implementing various functions when installed with various programs.

Figure 28:
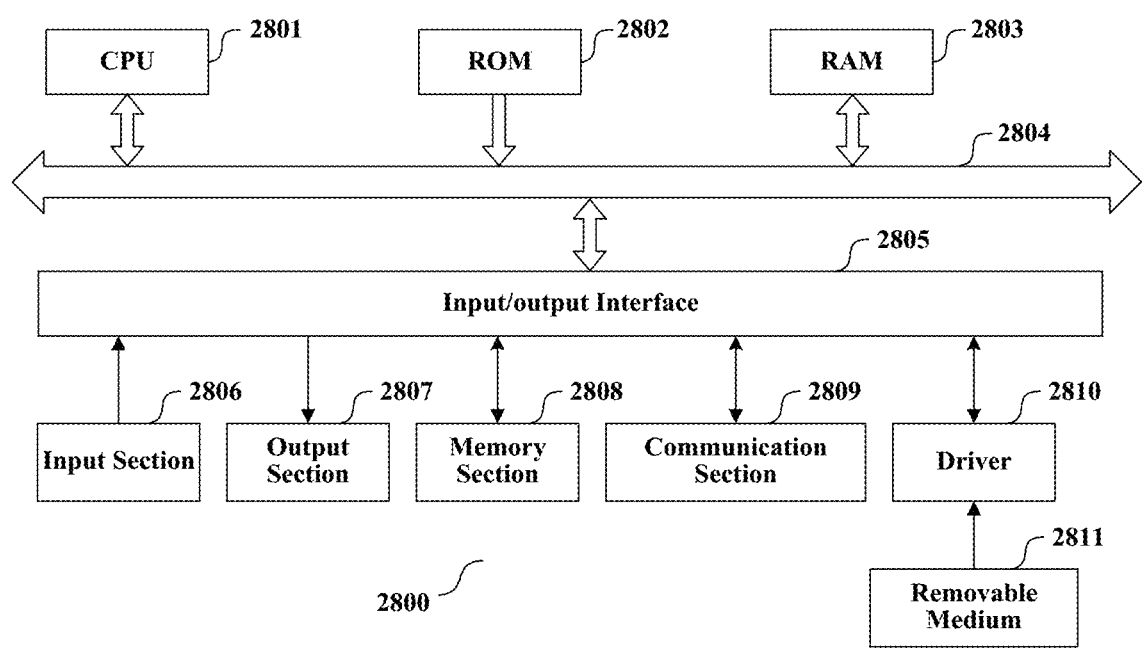
FIG. 28 is a block diagram of an exemplary block diagram illustrating the structure of a general purpose personal computer capable of realizing the method and/or device and/or system according to the embodiments of the present disclosure.

In FIG. 28, a central processing unit (CPU) 2801 executes various processing according to a program stored in a read-only memory (ROM) 2802 or a program loaded to a random access memory (RAM) 2803 from a memory section 2808. The data needed for the various processing of the CPU 2801 may be stored in the RAM 2803 as needed. The CPU 2801, the ROM 2802 and the RAM 2803 are linked with each other via a bus 2804. An input/output interface 2805 is also linked to the bus 2804.

The following components are linked to the input/output interface 2805: an input section 2806 (including keyboard, mouse and the like), an output section 2807 (including displays such as a cathode ray tube (CRT), a liquid crystal display (LCD), a loudspeaker and the like), a memory section 2808 (including hard disc and the like), and a communication section 2809 (including a network interface card such as a LAN card, modem and the like).

The communication section 2809 performs communication processing via a network such as the Internet. A driver 2810 may also be linked to the input/output interface 2805, if needed. If needed, a removable medium 2811, for example, a magnetic disc, an optical disc, a magnetic optical disc, a semiconductor memory and the like, may be installed in the driver 2810, so that the computer program read therefrom is installed in the memory section 2808 as appropriate.

In the case where the foregoing series of processing is achieved through software, programs forming the software are installed from a network such as the Internet or a memory medium such as the removable medium 2811.

It should be appreciated by those skilled in the art that the memory medium is not limited to the removable medium 2811 shown in FIG. 28, which has program stored therein and is distributed separately from the apparatus so as to provide the programs to users. The removable medium 2811 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 2802 and the memory section 2808 in which programs are stored, and can be distributed to users along with the device in which they are incorporated.

To be further noted, in the apparatus, method and system according to the present disclosure, the respective components or steps can be decomposed and/or recombined. These decompositions and/or recombinations shall be regarded as equivalent solutions of the disclosure. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . ." in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic device for wireless communications, comprising:
   processing circuitry, configured to:
      receive channel/resource allocation information indicating available spectrum resources to be used by the electronic device; and perform transmissions using the available spectrum resources indicated by the received channel/resource allocation information, wherein the channel/resource allocation information is determined based on an interference overlapping map, wherein the interference overlapping map is constructed based on an interference/co-existence relationship between a plurality of electronic devices, the plurality of electronic devices including the electronic device, within a management range of an electronic apparatus managing the plurality of electronic devices, wherein a connection point of the interference overlapping map represents one or more electronic devices from the plurality of electronic devices, wherein an edge of the interference overlapping map represents that there are interferences between electronic devices represented by two connection points of the edge, and wherein the interference overlapping map is constructed such that no edge is established between two connection points when the two connection points satisfy a predetermined condition.

2. The electronic device according to claim 1, wherein the interference overlapping map is constructed so that the channel/resources allocation information enables a variation of network overall interference conditions to be minimized or a spectrum resource utilization efficiency to be optimized.

3. The electronic device according to claim 1, wherein the interference overlapping map represents all members in a same common channel group with one connection point, and takes the number of the resource utilization systems represented by each connection point as a parameter of the interference overlapping map.

4. The electronic device according to claim 1, wherein the predetermined condition is that the required number of channels determined based on the interference overlapping map is not larger than the number of available channels.

5. The electronic device according to claim 1, wherein the interference overlapping map is colored, and the channel/resources allocation is performed based on a result of the coloring.

6. A method of wireless communications performed by an electronic device, the method comprising:
receiving channel/resource allocation information indicating available spectrum resources to be used; and
performing transmissions using the available spectrum resources indicated by the received channel/resource allocation information, wherein the channel/resource allocation information is determined based on an interference overlapping map, wherein the interference overlapping map is constructed based on an interference/co-existence relationship between a plurality of electronic devices, the plurality of electronic devices including the electronic device, within a management range of an electronic apparatus managing the plurality of electronic devices, wherein a connection point of the interference overlapping map represents one or more electronic devices from the plurality of electronic devices, wherein an edge of the interference overlapping map represents that there are interferences between electronic devices represented by two connection points of the edge, and wherein the interference overlapping map is constructed such that no edge is established between two connection points when the two connection points satisfy a predetermined condition.

7. A non-transitory computer medium comprising instructions for a method of wireless communications performed by an electronic device, the method comprising:
receiving channel/resource allocation information indicating available spectrum resources to be used; and
performing transmissions using the available spectrum resources indicated by the received channel/resource allocation information, wherein the channel/resource allocation information is determined based on an interference overlapping map, wherein the interference overlapping map is constructed based on an interference/co-existence relationship between a plurality of electronic devices, the plurality of electronic devices including the electronic device, within a management range of an electronic apparatus managing the plurality of electronic devices, wherein a connection point of the interference overlapping map represents one or more electronic devices from the plurality of electronic devices, wherein an edge of the interference overlapping map represents that there are interferences between electronic devices represented by two connection points of the edge, and wherein the interference overlapping map is constructed such that no edge is established between two connection points when the two connection points satisfy a predetermined condition.

* * * * *